United States Patent
Milojicic et al.

(10) Patent No.: US 12,360,778 B2
(45) Date of Patent: Jul. 15, 2025

(54) SELF-ADAPTABLE ACCELERATORS HAVING ALTERNATING PRODUCTION/OPTIMIZING MODES

(71) Applicant: HEWLETT PACKARD ENTERPRISE DEVELOPMENT LP, Spring, TX (US)

(72) Inventors: Dejan S. Milojicic, Milpitas, CA (US); Sai Rahul Chalamalasetti, Milpitas, CA (US); Sergey Serebryakov, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 341 days.

(21) Appl. No.: 18/308,275

(22) Filed: Apr. 27, 2023

(65) Prior Publication Data

US 2024/0362031 A1    Oct. 31, 2024

(51) Int. Cl.
*G06F 9/445*  (2018.01)
*G06F 11/34*  (2006.01)

(52) U.S. Cl.
CPC ...... *G06F 9/44505* (2013.01); *G06F 11/3495* (2013.01)

(58) Field of Classification Search
CPC .. G06F 9/44505; G06F 11/3495; G06N 3/082
USPC .......................................................... 714/1
See application file for complete search history.

(56) References Cited

U.S. PATENT DOCUMENTS

| | | | | |
|---|---|---|---|---|
| 7,020,697 B1* | 3/2006 | Goodman | .............. | G06Q 10/06 714/1 |
| 8,437,284 B2* | 5/2013 | Plamondon | ............. | H04L 41/00 370/293 |
| 8,499,189 B2* | 7/2013 | Krishnamurthy | ......... | G06F 9/50 714/1 |
| 10,372,700 B2 | 8/2019 | Asaad et al. | | |
| 10,892,944 B2 | 1/2021 | Schardt et al. | | |
| 2019/0044832 A1* | 2/2019 | Deval | ................ | H04L 41/0816 |
| 2020/0005124 A1 | 1/2020 | Sengupta et al. | | |
| 2021/0049465 A1 | 2/2021 | Bogdan et al. | | |

FOREIGN PATENT DOCUMENTS

CN    110222815 A    9/2019

* cited by examiner

*Primary Examiner* — Albert Decady
*Assistant Examiner* — Enam Ahmed
(74) *Attorney, Agent, or Firm* — Dickinson Wirght

(57) ABSTRACT

Systems and methods are provided for an accelerator system that includes a baseline (production) accelerator, optimizing accelerator, and control hardware accelerator, and an operation of alternatingly switching the production/optimizing accelerators between production and optimizing. With two production/optimizing accelerators, at any given point in time, one accelerator adapts while another accelerator processes data. Once the second accelerator starts doing a better job (e.g., has adapted to data drift), the accelerators change their modes, and the trainable accelerator becomes the "optimized" one. The accelerators do this non-stop, thus maintaining redundancy, providing expected quality of service (QoS) and adapting to data/concept drift.

20 Claims, 10 Drawing Sheets

SELF-ADAPTABLE ACCELERATORS HAVING ALTERNATING PRODUCTION/OPTIMIZING MODES

BACKGROUND

There are many neural networks that are "overkill" in terms of computation, power, memory etc. Redundancy has been used for improving the reliability of neural networks by having a standby replica of processing elements, with switching from failed components to their standby replicas. In certain industries, redundancy involving deployment of multiple accelerators is a must-have feature due to regulatory requirements, such as, for instance, guaranteeing a certain level of reliability. This redundancy usually results in numerous optimizations, such as quantization at different precision levels. There is still no systematic way of optimizations, and it usually entails model retraining.

BRIEF DESCRIPTION OF THE DRAWINGS

The present disclosure, in accordance with one or more various examples of the disclosed technology, is described in detail with reference to the following figures. The figures are provided for purposes of illustration only and merely depict typical or example aspects of the disclosed technology.

Figure 1:
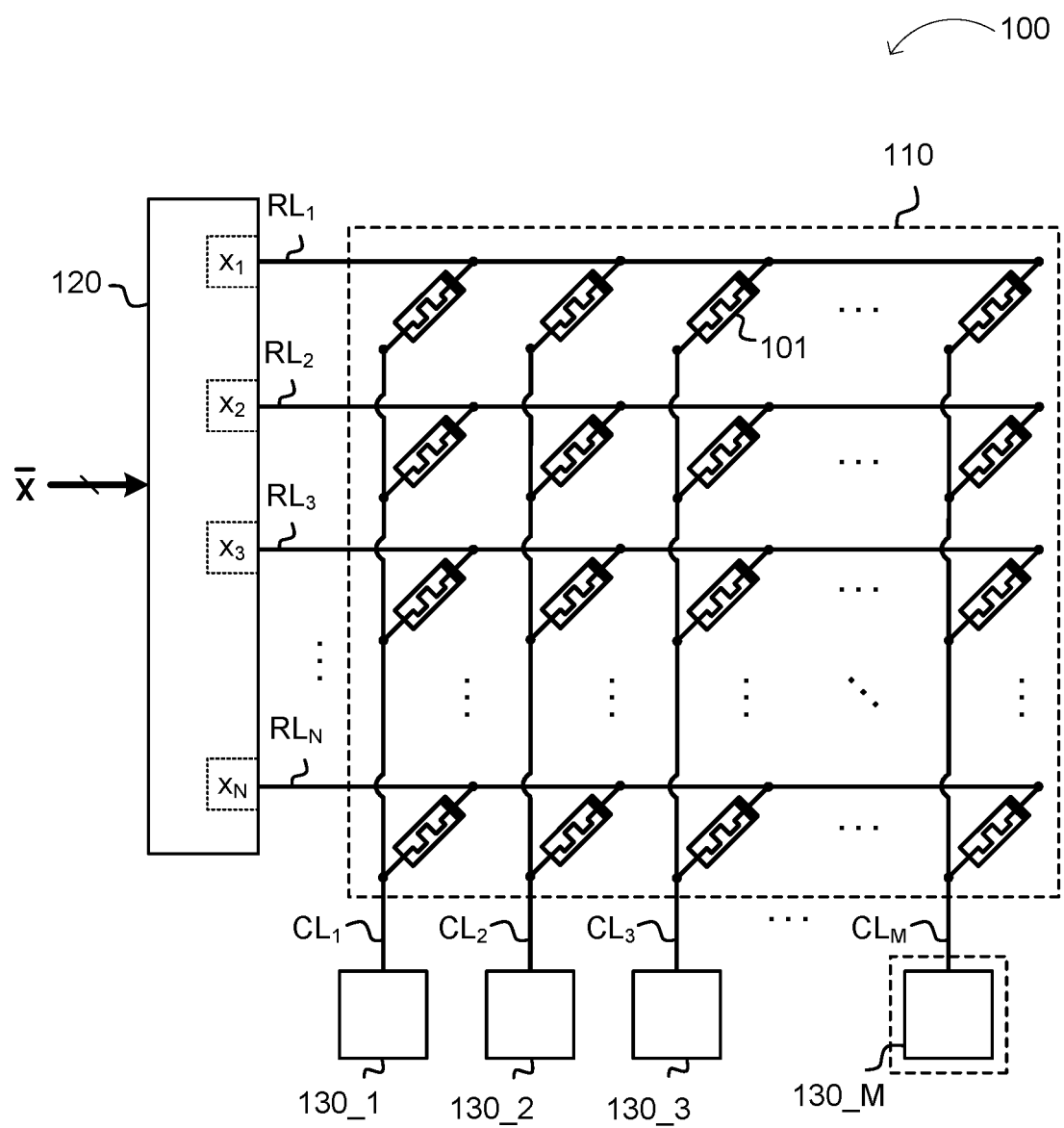
FIG. 1 illustrates a memristor crossbar array (i.e., accelerator), in accordance with one or more examples described herein.

The figures are not exhaustive and do not limit the present disclosure to the precise form disclosed.

DETAILED DESCRIPTION

It is to be understood that the figures and descriptions of the disclosed technology may have been simplified to illustrate elements that are relevant for a clear understanding of the disclosed technology, while eliminating, for purposes of clarity, other elements found in a typical accelerator system or typical method of using an accelerator system. Those of ordinary skill in the art will recognize that other elements may be desirable and/or required in order to implement the disclosed technology. However, because such elements are well known in the art, and because they do not facilitate a better understanding of the disclosed technology, a discussion of such elements is not provided herein. It is also to be understood that the drawings included herewith only provide diagrammatic representations of the structures of the disclosed technology and that structures falling within the scope of the disclosed technology may include structures different than those shown in the drawings. Reference will now be made to the drawings wherein like structures are provided with like reference designations.

Before explaining at least one example of the disclosed technology in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented devices, structures, apparatuses, systems, methods, features, and advantages will be or become apparent to one with skill in the art upon examining the drawings and the detailed description herein. It is intended that all such additional devices, structures, apparatuses, systems, methods, features, and advantages be protected by the accompanying claims.

For purposes of this disclosure, the phrases "memristor crossbar array", "memristive DPE", or term "accelerator" (and respective derivatives thereof) may all be used interchangeably.

As used herein, a "dot product" refers broadly to the product of two vectors to form a scalar whose value is the product of the magnitudes of the vectors and the cosine of the angle between them. In the context of a memristive DPE, a dot product may be determined by applying a voltage to an input and multiplying the voltage by a conductance that is programmed into the DPE to get a current, as described in greater detail below with reference to FIG. 3.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

In traditional chip processing, accelerators are used to perform several complex computations. For example, in a convolution neural network (CNN) and other types of artificial neural networks, the network is made up of neurons that have learnable weights. The weights of these networks are initialized with random numbers drawn from a predefined distribution such as a Gaussian distribution to allow the neurons to learn to compute useful features during training. Each neuron receives some inputs, performs a dot product between these inputs and vector of weights, and potentially adjusts the weights as the training progresses. As such, the weights can be adjusted for each specific training task.

However, with traditional chip processing, these training computations are performed serially and can waste processing power that would otherwise be available on the chip. This is especially wasteful in deep learning processes. For example, in convolutional neural networks (CNN) and some other classes of deep neural networks, the processing is performed at each layer. The layer's weights consist of a set of learnable filters, which have a small receptive field, but extend through the full depth of the input. During the forward pass, each filter is convolved across the width and height of the input volume, computing the dot product between the entries of the filter and the input, and producing a 2-dimensional activation map of that filter. As a result, the network learns filters that activate when it detects some specific type of feature at a spatial position in the input.

Examples of the disclosed technology described herein improve the computation of convolutions on crossbar-based accelerators like DPE that are inefficiently used in traditional chip processing by incorporating intra-crossbar computations and inter-crossbar computations. In crossbar computations, the convolution layer can be flattened into vectors, and the vectors can be grouped into a matrix where each row or column is a flattened filter. Each submatrix of the input corresponding to a position of a convolution window is also flattened into a vector. The convolution is computed as the dot product of each input vector and the filter matrix. In intra-crossbar computations, the unused space of the crossbars is used to store replicas of the filters matrices and the unused space in $X_N$ is used to store more elements of the input. In inter-crossbar computations, the unused crossbars are used to store replicas of the filters matrices and the unused $X_N$s are used to store more elements of the input. Then, the method performs multiple convolution iterations in a single step.

Examples of the disclosed technology also reduce the number of computations for convolving large inputs. For example, during each convolution, the system may extract useful features from the input using different types of filters whose weights are automatically learned during training. In some examples of the disclosed technology, the filters may be replicated and the convolutions may be performed on unused crossbars in the chip. By extrapolating the inter-crossbar filters replication technique, the system can apply the improved convolution process even when the crossbar is already fully utilized but there are unused crossbars in the chip.

The intra-crossbar computations can reduce the wasting of resources associated with large crossbars when computing convolutions with small filters (e.g., the filters fill a small percentage of the crossbar space). The size of the filters may not be changed, but the system may implement inter-crossbar computations and intra-crossbar computations to perform multiple convolution iterations in a single step. Additionally, when combining the intra-crossbar computations with inter-crossbar computations, the system is enabled to use of larger crossbars while ensuring efficiency regardless of the size of the filters' receptive fields. This may be helpful to improve at least the beginning of processing a CNN, where traditional systems utilize a low number of weights and a high size of input.

FIG. 1 provides an example electronic device, in accordance with examples of the disclosure. In some examples, the electronic device (e.g., an accelerator, etc.) is organized in a hierarchy of crossbars as well as a local processor that orchestrates computation and performs the operations not handled by the crossbars. The crossbars may perform matrix-vector multiplication (MVM) on a fixed-size matrix block. The example electronic device illustrated in FIG. 1 includes memristor crossbar array 100, row driver circuitry 120, and a number of column output circuits 130 that each correspond to one of the column lines CL of the memristor crossbar array 100.

The memristor crossbar array 100 may include N row lines RL (where N≥1), M column lines CL (where M≥1), and a number of memristors 101 that each are connected between one of the row lines RL and one of the column lines CL (see dashed box 110). In certain examples, each intersection of a row line RL with a column line CL may have a corresponding memristor 101. Each of the row lines $RL_n$ may correspond to a digital input value $x_n$ of a digital input vector $\overline{X}=(x_1, x_2, \ldots, x_N)$. Specifically, row line $RL_1$ corresponds to digital input value $x_1$, row line $RL_2$ corresponds to digital input value $x_2$, and so on.

Row driver circuitry 120 serves as an input stage of crossbar array 100, and may apply analog voltages to the row lines RL across a plurality of time periods based on the digital input vector $\overline{X}$ according to a distributed digital-to-analog conversion architecture. Specifically, in certain examples the row driver circuitry 120 may apply a plurality of analog voltages $V_1, V_2, \ldots V_P$ to a node during a plurality of time periods $t_1, t_2, \ldots, t_P$, respectively, and, for each of the row lines RL, selectively connect the row line $RL_n$ to the node during one of the plurality of time periods $t_1, t_2, \ldots, t_P$ based on the corresponding digital input value $x_n$ of the digital input vector $\overline{X}$. For example, any row lines $RL_n$ whose digital input value $x_n$ is equal to "1" may be connected to the node during the first time period $t_1$, any row lines $RL_n$ whose digital input value $x_n$ is equal to "2" may be connected to the node during the first time period $t_2$, and so on.

Column output circuits 130_M (where M≥1) may each include an integration capacitor $C_{int}$ (not shown) and a switch $S_1$ (not shown) that is controlled by an integration control signal Ctr_Int (not shown). In certain examples, each of the column output circuits 130_M may include similar features in similar configurations (except for being connected to different column lines $CL_M$).

Computational workloads associated with creating deep neural networks generally include a training phase and inference phase. During the training, the neural network tries to learn from a set of input training data. Each layer of an untrained model is assigned some random weights and a model runs a forward pass through the input training data. This forward pass computes model outputs, e.g., predicts class labels for classification models by determining the class scores using the model weights. The class scores are compared against actual labels, and an error is computed with a loss function. Then in a backward pass the error is back propagated through the neural network and weights are updated. For example, the weights may be updated via an algorithm such as gradient descent. The gradient descent algorithm is an optimization algorithm used to find values of parameters (i.e., coefficients) of a function that minimizes a cost function.

An epoch refers to a complete forward pass and backward pass through all of the samples of the input training data. Typically, using traditional CMOS-based CPUs these computations are very expensive, and are performed using a single weight update after processing for every sample. In this case, training data is separated into batches, and weights are updated after each batch.

The common computation structure (matrix dot product) used in the deep learning workloads has led to application of GPUs for providing performance speed up over the traditional CPU. A GPU is more capable of handling vector and matrix calculations than a CPU. A single or parallel graphical processing units (GPUs) may be used to speed up the processing. However, GPUs which have been built for graphics applications are not fully optimized for the deep learning workloads requirements and suffer from performance and energy inefficiency.

Using a memristor crossbar array further decreases processing times over GPUs, and the memristor crossbar array provides for high computation performance with lower energy requirements. A memristor crossbar array may be used for matrix dot product calculations during the training phase. During a backward pass of the training phase, changes in model weights may be made from a last layer of a model to a first layer of a model. The memory memristor crossbar array may be iteratively updated with the model weights, and matrix dot product calculations performed to determine an optimum model.

Comparator circuitry electronically coupled to a vector output register of a memristor crossbar array may compare already available data in the memristor crossbar array with the new model weights data being written to the crossbar array. Provided below are two example generic approaches to updating weights (trainable parameters of neural networks represented as floating point numbers) stored in a crossbar array. In the first example approach, unmatched values in the memristor crossbar array are updated leaving matched values intact. In the second example approach, absolute delta weight values of new model weights are evaluated against a threshold to determine whether to update the crossbar array. In either example approach, weights are programmed by changing conductance of memristors in the crossbar arrays. In the first example approach, a weight encoded in a crossbar cell using a particular conductance is not updated if it exactly matchers new weight to be programmed in the same cell. In the second example approach, weights (i.e., a current weight value and a new weight value to be programmed) must not match exactly to avoid reprogramming a particular cell. Instead, the threshold is introduced that determines a tolerance to a difference between a current and new value of a weight. Weights are usually described when models are trained using conventional hardware. But when models are deployed on hardware powered by crossbar arrays, weights are represented using conductance of memristors. Hence, the threshold here applies to a difference of some kind between current conductance and a new conductance that are estimated to be programmed in a given cell.

The following are example steps in one approach in determining the threshold. First, the current conductance $C\_current$ is determined. Next, given a new value of the weight, a new conductance is estimated that is desired to program $C\_new$ with. This estimated value may be associated with some uncertainty that can be computed because the noise levels in memristors is known. Although not necessary, the uncertainty may be taken into account for computations described below. Next, a distance function is defined between two conductance values. This distance function defines how similar two values are, and, in general, a number of such distance functions can be used. One example of such a function is absolute value: distance $(C\_current, C\_new)=|C\_current-C\_new|$. Another example of such a function could be relative difference: distance $(C\_current, C\_new)=(C\_new-C\_current)/C\_current$. Given the choice of distance function, a value is selected which is referred to above as the threshold. A crossbar cell is not re-programmed if the selected distance between current conductance and new conductance to be programmed is below this threshold. This threshold can be empirically estimated, or manually chosen. The threshold may, for example, fall within some range of conductance, which could be either absolute or a fraction of the existing weight, e.g., a 2% or 5% difference which can be applied to the relative difference distance function above.

Figure 2:
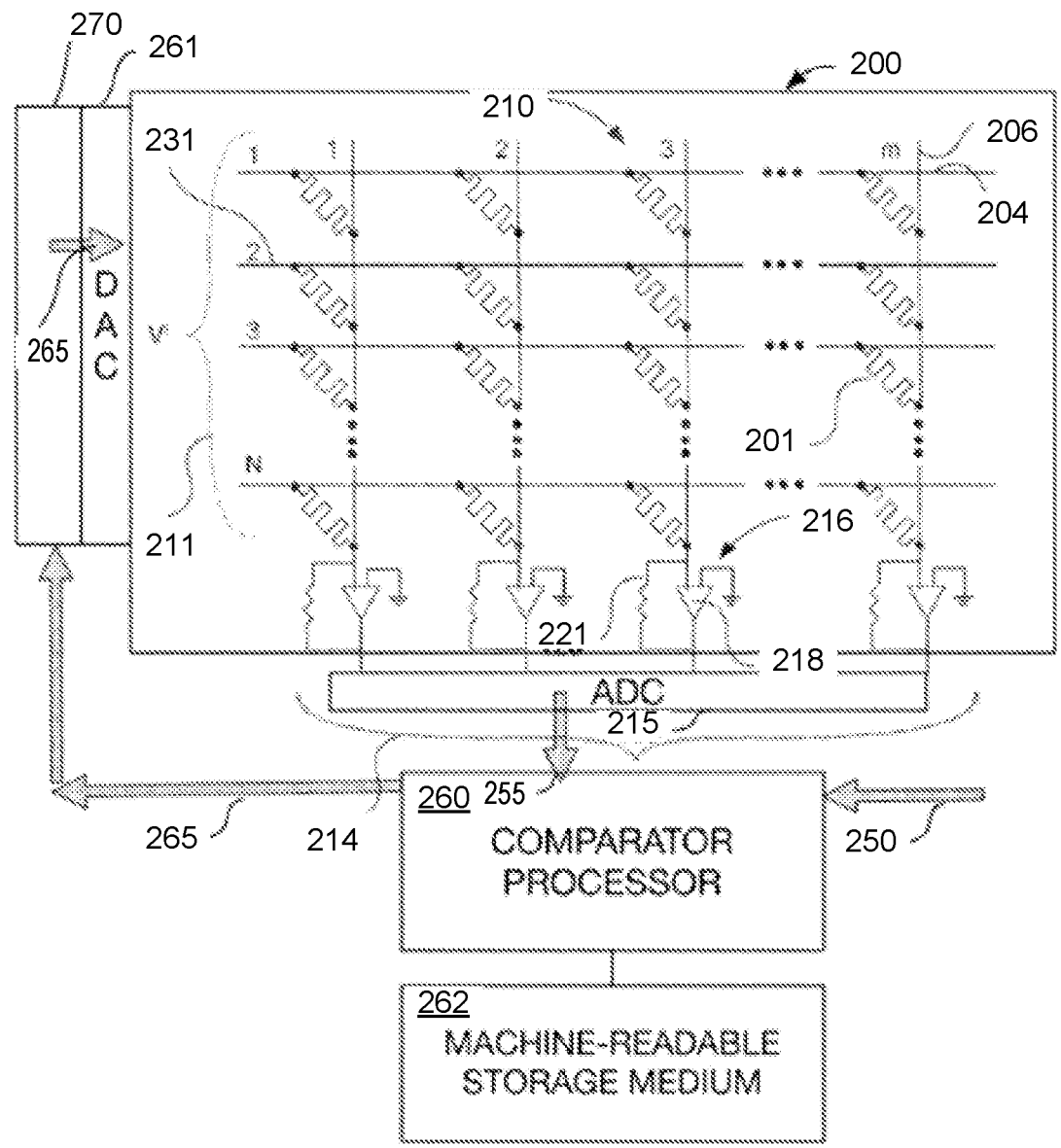
FIG. 2 illustrates a memristive dot product engine with a comparator processor, in accordance with one or more examples described herein.

An example memristive crossbar array is now described for use in neural network deep learning applications. While a particular example of a memristive crossbar array is described, other configurations of memristive crossbar arrays may be used. FIG. 2 illustrates a memristive dot product engine 200 having a single vector of voltage. The dot product engine 200 includes a crossbar array 210 including N row electrodes 204 and M column electrodes 206. Each crossbar junctions throughout the crossbar array 210 include a memristive element 201, thereby forming a memory element of the dot product engine. Each memory element may include a memristor and a transistor in series with one another. The dot product engine 200 includes a vector input register or vector input 211 for applying voltages to the row electrodes 204 and a vector output register or vector output 214 for receiving output voltages resulting from current flows in the column electrodes 206. The vector input may be coupled to digital to analog convertor 261 to convert digital values to analog values for writing to the crossbar array 210. The vector output 214 may include an analog to digital convertor 215 to convert analog values to digital values. The dot product engine 200 also includes sense circuitry 216 for converting an electrical current in a column electrode 206 to a voltage. In an example, the sense circuitry 216 includes an operational amplifier 218 and a resistor 221, which can be arranged to represent a virtual ground for read operations.

The dot product engine 200 may also include other peripheral circuitry associated with crossbar arrays 210 used as storage devices. For example, the vector input 211 may include drivers connected to the row electrodes 204. An address decoder can be used to select a row electrode 204 and activate a driver corresponding to the selected row electrode 204. The driver for a selected row electrode 204 can drive a corresponding row electrode 204 with different voltages corresponding to a vector-matrix multiplication or the process of setting resistance values within the memristive elements 201 of the crossbar array 210. Similar driver and decoder circuitry may be included for the column electrodes 206. Control circuitry may also be used to control application of voltages at the inputs and reading of voltages at the outputs of the dot product engine 200. Digital to analog circuitry and analog to digital circuitry may be used at the vector inputs 211 and at the vector output 214. Input signals to the row electrodes 204 and column electrodes 206 can be either analog or digital. The peripheral circuitry above described can be fabricated using semiconductor processing techniques in the same integrated structure or semiconductor die as the crossbar array 210 in the above example. As described in further detail below, there are two main operations that occur during operation of the dot product engine. The first operation is to program the memristors in the crossbar array so as to map the mathematic values in an N×M matrix to the array. In one example, one memristor is programmed at a time during the programming operation. The second operation is the dot product or matrix multiplication operation. In this operation, input voltages are applied and output voltages obtained, corresponding to the result of multiplying an N×M matrix by an N×1 vector. The input voltages are below the threshold of the programming voltages so the resistance values of the memristors in the array 210 are not changed during the matrix multiplication operation.

The dot product engine 200 may include an analog-to-digital converter 215 to convert analog signals of the vector output register 214 to digital values. The dot product engine 200 may include a digital-to-analog converter 261 to convert digital values to analog values to the vector input register 211.

The dot product engine 200 may be electronically coupled to comparator processor 260. The comparator processor 260 may be integrally coupled to the dot product engine 200 and formed as a part thereof. The comparator processor 260 may be a separate component, such as an integrated circuit, or separate processor. The comparator processor 260 may be one or more central processing units (CPUs), semiconductor-based microprocessors, and/or other hardware devices suitable for retrieval and execution of instructions stored in machine-readable storage medium. The comparator processor may fetch, decode, and execute instructions, to control processes for comparing and/or evaluating data received, as shown by arrow 215, from the dot product engine 215 to an input data source, as shown by arrow 250 to the comparator processor. As an alternative or in addition to retrieving, and executing instructions, the comparator processor 260 may include one or more electronic circuits that include electronic components for performing the functionality of one or more instructions, e.g., a Field Programmable Gate Array (FPGA) or Application Specific Integrated Circuit (ASIC). The comparator processor may include memory for storing executable instructions, and/or be coupled to a separate storage medium 262.

A machine-readable storage medium, such as 262, may include both volatile and nonvolatile, removable and non-removable media, and may be any electronic, magnetic, optical, or other physical storage device that contains or stores executable instructions, data structures, program module, or other data accessible to comparator processor 260, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

The comparator processor 260 may perform a method for comparing and/or evaluating input vector data (as represented by arrow 250) to output vector data (as represented by arrow 255) already loaded into the memristor memory of the dot product engine 200. The comparator processor 260 may provide changed data values (as represented by arrow 265) to another circuit or processor 270 to write the changed data values back to the memristor memory of the dot product engine 200.

In deep learning processing, the comparator circuitry described above reduces the number of write operations to the crossbar array, thereby accelerating overall computational processing efficiency, and reducing overall processing times for the training phase of the neural network. However, although the comparator circuitry is advantageous for these reasons, further improvements and advantages (e.g., to computational processing efficiency and to a reduction in overall processing time) can be effectuated as set forth below.

Figure 3:
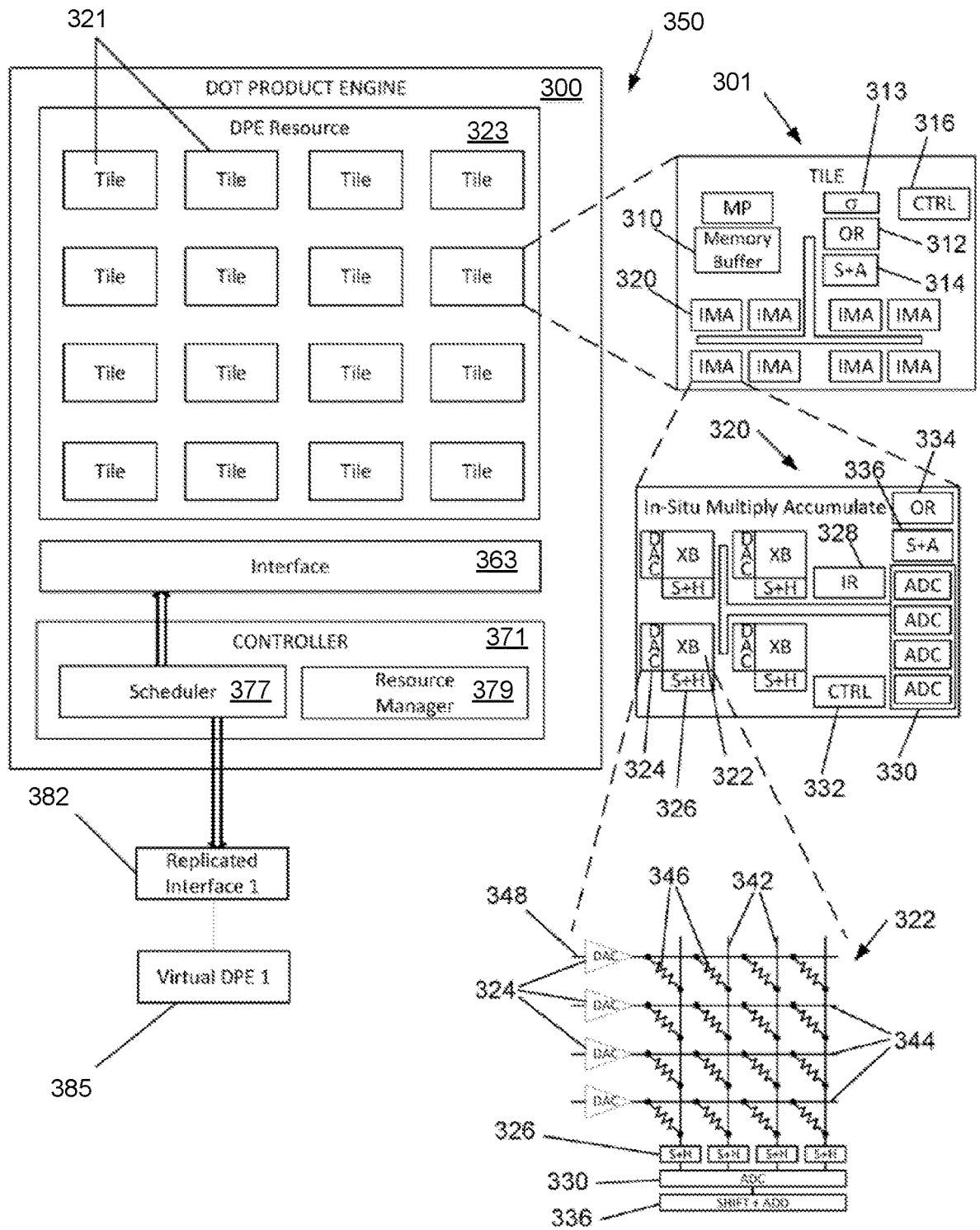
FIG. 3 illustrates a system for virtualization of a memristive dot product engine (DPE) with a resource of the memristive DPE, and with a detailed illustration of a tile in the resource of the memristive DPE, in accordance with one or more examples described herein.

Referring now to FIG. 3, an example system for virtualization of a memristive DPE is illustrated. The example system 350 includes a memristive DPE 300. As used herein, the term "memristor" may refer to a passive two-terminal circuit element that maintains a functional relationship between the time integral of current, and the time integral of voltage. Further, the term "memristive dot product engine" refers broadly to a dot product engine that includes a memristive crossbar array.

The example memristive DPE 300 includes at least one DPE resource 323. In various examples, the DPE resource 323 includes at least one memristive crossbar array which includes a number of row lines and a number of column lines intersecting the row lines. An example DPE resource 323 is described below in greater detail with reference to FIGS. 2 and 3.

The example memristive DPE 300 further includes an interface 363. In various examples, the interface 363 is an input/output interface which allows the DPE 300 to be communicatively coupled to an external component. For example, a processor of a computing system may be coupled to the DPE 300 through the interface 363 and may obtain access to the DPE resource 323.

In the example system 350, the example memristive DPE 300 is further provided with a controller 371. In various examples, the controller 371 may control various aspects of the example memristive DPE 300. For example, the controller 371 may determine which resources are available to or allocated for various tasks or users. The controller 371 in the example system 350 includes a scheduler 377 and a resource manager 379. The controller 371, or the scheduler 377 of the controller 371, is communicatively coupled to the external interface 363 to facilitate access to the DPE resource 323 by an external component, for example. The resource manager 379 may monitor availability of various portions of the DPE resource 323 and may selectively allocate the resource 323 to entities, such as the external component described above.

In various examples, the memristive DPE 300 is virtualized by replicating the external interface 363 of the physical memristive DPE 300. As illustrated in FIG. 3, the example system 350 includes replicated interfaces 382a-n. In various examples, any practical number of replicated interfaces 382a-n may be made available. In some examples, the system 350 may set a maximum number of replicated interfaces 382 to allow sufficient availability of resources.

Replication provides a mechanism by which a single physical memristive DPE 300 may appear as multiple separate physical devices to various users. In this regard, the physical memristive DPE 300 provides a unique memory space, work queues, interrupts, and command processing for each user via each replicated interface. In one example, the physical memristive DPE 300 is a Peripheral Component Interconnect Express (PCIe)-based DPE that can be configured to appear in the PCI configuration space as multiple functions. Each replicated interface provides its own configuration space. Thus, the physical memristive DPE 300 appears as separate, multiple PCIe devices.

Virtualization of the physical memristive DPE 300 may be achieved by providing a separate stream layer for each replicated interface 382, Thus, a user associated with a particular replicated interface 382 may access the resources (e.g., the DPE resource 323) of the physical memristive DPE 300 as a virtual DPE 385 through the corresponding replicated interface 382. In this regard, each replicated interface 382a-n is communicatively coupled to the controller 371, similar to the coupling of the controller 371 with the external interface 363 of the physical memristive DPE 300.

For example, in the example of FIG. 3, a user may access the DPE resource 323 of the physical memristive DPE 300 through the first replicated interface 382a. In this regard, the first replicated interface 382a may be associated with a corresponding virtual DPE 385a. The corresponding virtual DPE 385a is accommodated by the controller 371 of the physical memristive DPE 300 as a distinct stream layer. In various examples, the scheduler 377 may allocate timeslots, or time slices, to the various stream layers or virtual DPEs 385a-n.

In various examples, the scheduler 377 dynamically selects, on each timeslot, the stream layer, or virtual DPE 385, to run via the appropriate replicated interface 382. The scheduler 371 may support any of a variety of scheduling algorithms, such as round robin and weighted round robin, for example.

The resource manager 379 of the controller 371 in the example system 350 may selectively allocate at least one resource to a virtual DPE during each timeslot. For example, the resource manager 379 may dynamically select the scheduling algorithm and manage the type of actions a user, through the appropriate virtual DPE 385, is allowed to perform. For example, a particular stream layer, or virtual DPE, may be prevented from reconfiguring the physical memristive DPE.

In various examples, the scheduler 377 and the resource manager 379 may facilitate removal of layers from the scheduling algorithm. For example, in some cases, the entirety of the physical memristive DPE 300 may be allocated to a particular stream layer for an extended number of timeslots. In this regard, the particular stream layer may be a virtual DPE 385 or an external component coupled to the physical memristive DPE 300 through the external interface 363. In this regard, use of time slots or time slicing may also be disabled for the extended period.

The example system 350 of FIG. 3 is also illustrated with an example DPE resource 323 of the memristive DPE 300. The DPE resource 323 includes a number of tiles 321. In various examples, each tile 321 is a subset of the DPE resource 323. A number of tiles 321 may be allocated to a particular task or stream layer, for example. In this regard, the DPE resource 323 may be divided to accommodate and support any number of tasks simultaneously. Further, the tiles 321 may be arranged in any of a variety of manners. For example, in the example of FIG. 3, the tiles 321 are arranged in an array.

The example system of FIG. 3 is further illustrated with an example detailed illustration of a tile 321 in the DPE resource 323 of the memristive DPE 300. The example tile 301 is an example architecture using a memristive crossbar array. In this regard, the example tile 301 includes a memory buffer 310 (e.g., an enhanced dynamic random access memory, or eDRAM, buffer), as well as various other components such as an output register 312 and a shift-and-add unit 314. Memory buffer 310 may be, for example, a DRAM buffer or another type and may be used to store input values provided to the crossbar array 322 described below. Further, the output register 312 may be used to aggregate results from the shift-and-add unit 314, as also described below. Each tile of the DPE resource 323, such as the tile 301, is provided with a control unit 316 which may be communicatively coupled to the controller 371 of the memristive DPE 300. In this regard, each tile 321 is coupled to the controller 371 through a bus, providing connections between the controller 371 and various components of each tile 321, such as the control unit 316. The example tile 301 is provided with a set of components, referred to as in-situ multiply accumulate (IMA) units 320. In the example of FIG. 3, the tile 301 is provided with eight IMA units 320.

One example architecture of an IMA unit 320 is illustrated in detail in FIG. 3. In the illustrated example, the IMA unit 320 is provided with a number of memristor crossbar units 322. In the example of FIG. 3, the IMA unit 320 is provided with four memristor crossbar units 322. Each crossbar unit 322 is coupled to a digital-to-analog converter (DAC) 324 and a sample-and-hold unit 326. Signals from the DACs 324 may be combined (e.g., via an input register 328) and provided to a set of analog-to-digital converters (ADCs) 330. The IMA unit 320 of FIG. 3 further includes a control unit 332 which may be communicatively coupled to the controller 371 of the memristive DPE 300, for example, through the control unit 316 of the tile 301. The IMA unit 320 further includes various other components, such as an output register 334 and a shift-and-add unit 336. In various examples, the output register 334 of the IMA unit 320 may be part of or coupled to the output register 312 of the tile 301. Similarly, the shift-and-add unit 336 of the IMA unit 320 may be part of or coupled to the shift-and-add unit 314 of the tile 301.

In various examples, each memristive crossbar array 322 includes a number of row lines 344 and a number of column lines 342 intersecting the row lines 344. A memristive memory element 346 is located at each intersection of a row line 344 and a column line 342. Each memristive element 346 receives a programming vector signal to represent a value within a matrix, a reference vector signal, and an operating vector signal to represent a vector value to be multiplied by the matrix. In this regard, the row lines 344 of the crossbar array 322 are coupled to the DACs 324 to provide the row lines 344 with an input voltage 348, in accordance with input values stored in the memory buffer 310, forming the input vector signal. Further, each column line 342 is coupled to the sample-and-hold unit 326 to receive a current flow from the column lines 342. The sample-and-hold units 326 are coupled to an ADC 330 and shift-and-add unit 336 to convert the electrical current in the column line 342 to a voltage signal. In various examples of the DPE, vector and matrix multiplications are performed by applying the input voltages 348 to the row lines 344 and collecting the currents through the column lines 342 and measuring the output voltage.

Thus, dot product operations may be performed on the crossbar arrays 322, and the results are sent to the ADCs 330 and aggregated in the output registers 334 or output registers 312. The aggregated result is sent through a sigmoid operator 313 and stored in the memory buffer 310 for further processing, for example.

Enhancements of the Machine Learning (ML) algorithms have been improving, extending applicability of low precision arithmetic for implementing computations in the ML models. Nowadays, the low precision processing is limited to certain use cases (ML models) and types of input data sets, so a generic accelerator usage in a compute farm isn't effective with respect to energy efficiency.

Also, there are many neural networks that are "overkill" in terms of computation, power, memory etc. Redundancy has been traditionally used for improving the reliability by having a standby replica of processing elements, with switching from failed components to their standby replicas. A common hardware solution has been to use tightly coupled processor cores running in a lockstep for comparing the outputs to address spurious errors. A common software solution has been to conduct redundant computations in distributed systems to speed up the ML model inference by selecting the quickest computation path. This redundancy usually results in numerous optimizations, such as quantization at different precision levels. There is still no systematic way of optimizations, and it usually entails model retraining. Also, energy efficiency is desirable for some applications (especially at the edge where power is scarce) as is performance in some real-time applications.

A solution to the above problems is an implementation using a baseline (production) accelerator, optimizing accelerator, and control hardware accelerator, and an operation of alternatingly switching the production/optimizing accelerators between production and optimizing. The switching in the implementation would be seamless without any glitches in output, which means that the baseline can be flushed out while effectively activating the optimizing accelerator. The implementation can yield autonomous adjustment of quality of service (QoS) with dynamic policies. Customers can benefit from (self-)reconfigurable accelerators which would result in savings compared to buying multiple/redundant solutions for different use cases, resulting in less hardware. Furthermore, adaptivity helps in terms of managing infrastructure, so less manageability can be employed.

Figure 4:
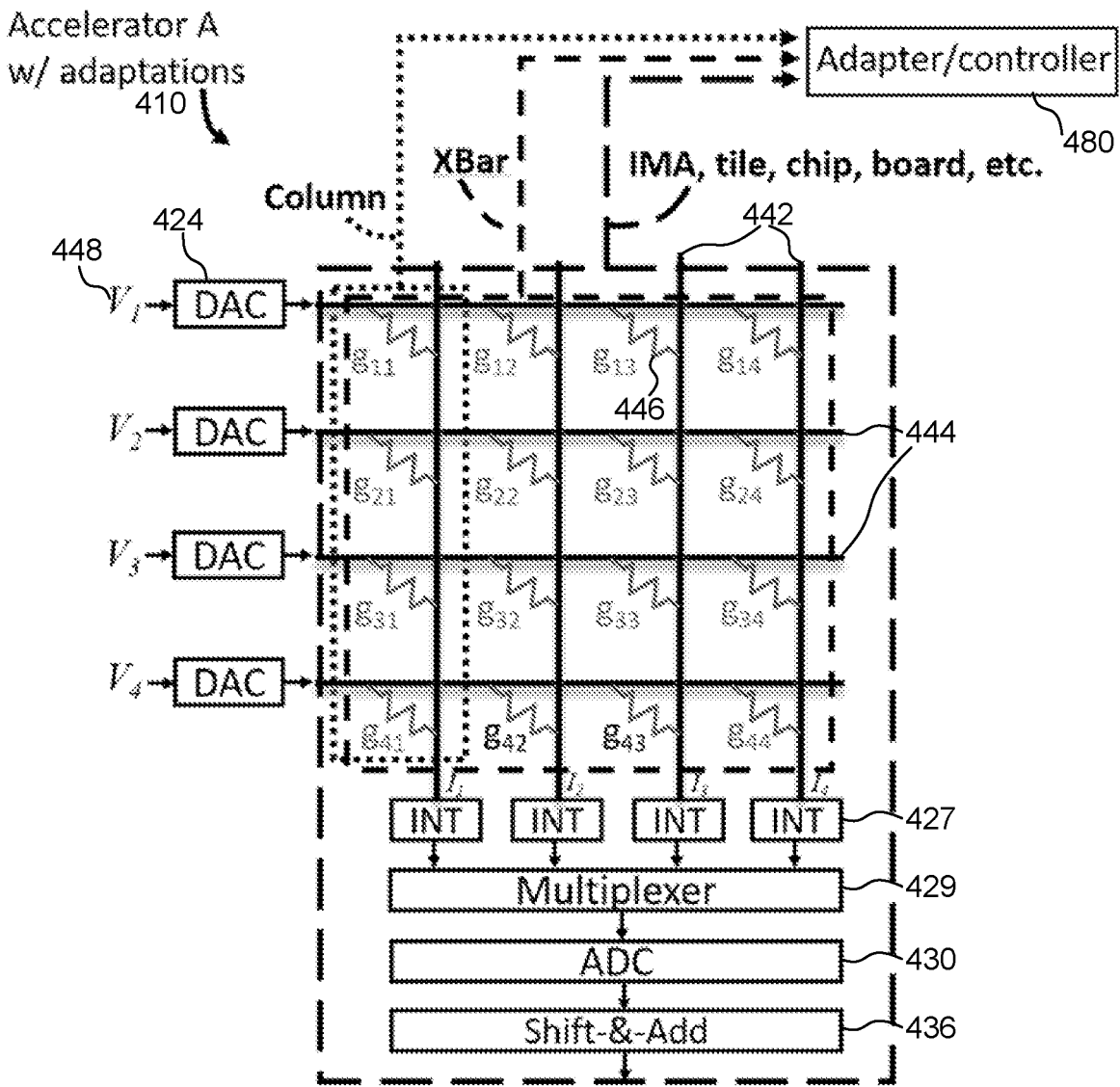
FIG. 4 illustrates an adaptive memristor crossbar array (i.e., adaptive accelerator), in accordance with one or more examples described herein.
Figure 5:
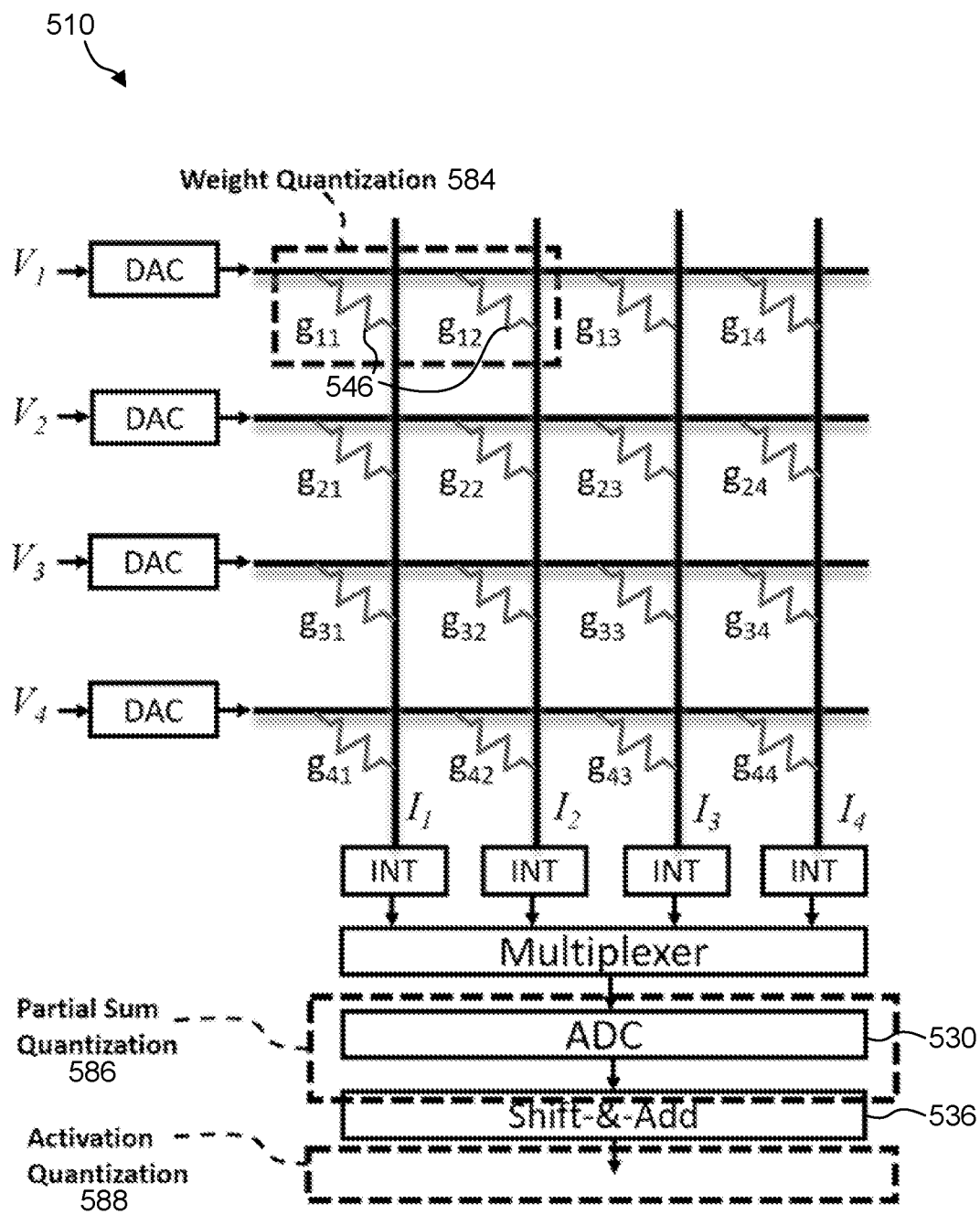
FIG. 5 illustrates a memristor crossbar array in optimizing mode (i.e., optimizing accelerator), in accordance with one or more examples described herein.
Figure 6:
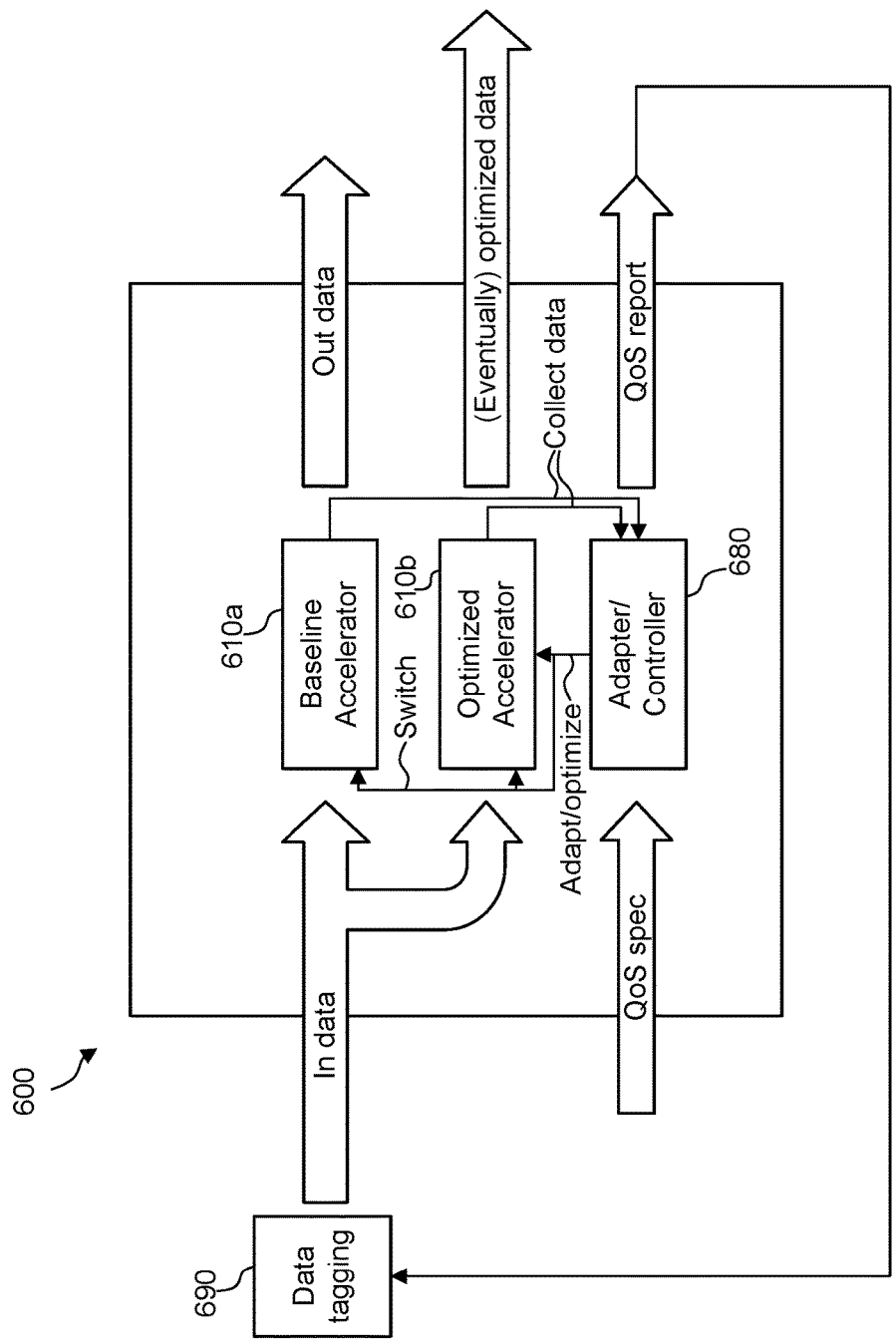
FIG. 6 illustrates an adaptive accelerator system depicting ordering of data using data tagging, in accordance with one or more examples described herein.

With reference to FIGS. 4-6, a solution to the above problems is an implementation using a baseline (production) accelerator, optimizing accelerator, and control hardware accelerator, and an operation of alternatingly switching the production/optimizing accelerators between production and optimizing.

An example hardware/software implementation is disclosed herein that processes input data on the fly, can route future data of similar characteristics to respective ML hardware (with optimum arithmetic precision) supporting QoS and service level agreement (SLA), and can provide energy efficiency. The implementation relies on a) pre-processing of new data for a certain time interval, b) taking feedback from accelerators with different arithmetic precision, and c) recommending optimal arithmetic precision and respective accelerator for such kind of data. Using this as a reference, any data that matches similar characteristics would be routed to the optimal hardware platform in the future. This is implemented using a pair of accelerators where one is continuously evaluating while the other is in production mode.

With this implementation, instead of keeping the accelerators static, the present disclosure describes accelerators that adapt to changing environmental conditions, and data and concept drift. With two optimizing/production accelerators, at any given point in time, one adapts while another one processes data. Once the second accelerator has adapted to data drift, accelerators change their modes, and the trainable accelerator becomes the "optimized" one. The accelerators do this non-stop, thus maintaining redundancy, providing expected QoS and adapting to data/concept drift.

With this configuration (per, for example, the configurations of FIGS. 4-6), an accelerator can be configured to process pre-processing data while in an optimization mode. Also, with this configuration, a control accelerator can be configured to: alter operation parameter(s) (such as those in FIG. 5 with reference to, for example, weight quantization, partial sum quantization, and/or activation quantization, while the operation parameter(s) could also be at a higher level, i.e., coarser granularity, such as at the core level or at the array level, or by re-routing via, for example, short circuiting certain layers) of the first accelerator while in optimization mode to determine the effect of each altered operation parameter on a QoS (it is noted that a parameter can affect the QoS by causing the adapter to perform better or worse than baseline in terms of QoS goals. Or it can perform similarly. Switching would be consider only in the first/better case, but not in the second/worse case and third/similar case); switch the first accelerator from optimization mode to production mode upon determining the optimal operation parameter(s) of the first accelerator; switch a second accelerator from production mode to optimization mode; and alter operation parameter(s) of the second accelerator while in optimization mode to determine the effect of each altered operation parameter on the QoS. Switching from one accelerator running one model in production mode and continue to optimize the other one may help in accuracy as well as power saving. This implementation also enables a broader set of adjustments, such as precision, power consumption, rerouting of data, etc.

Referring now to FIG. 4, an example accelerator A (i.e., memristive crossbar array A) 410 is depicted. Accelerator A 410 is generally similar to the accelerator (memristive crossbar array 322) shown in FIG. 3, but includes adaptations. Each accelerator 410 includes a number of row lines 444 and a number of column lines 442 intersecting the row lines 444. A memristive memory element 446 is located at each intersection of a row line 444 and a column line 442. Each memristive element 446 receives a programming vector signal to represent a value within a matrix, a reference vector signal, and an operating vector signal to represent a vector value to be multiplied by the matrix. In this regard, the row lines 444 are coupled to the DACs 424 to provide the row lines 444 with an input voltage 448, in accordance with input values stored in a memory buffer (see memory buffer 310 in FIG. 3), forming the input vector signal. Further, each column line 442 is coupled to an interface (INT) 427 to receive a current IN flow from the column lines 442. Output signals from the INTs 427 are input to a multiplexer 429 which combines the INT output signals. The output from the multiplexer 429 is coupled to an ADC 430 and shift-and-add unit 436 to convert the electrical current IN in the column line 442 to a voltage signal. During operation, vector and matrix multiplications are performed by applying the input voltages 448 to the row lines 444 and collecting the currents IN through the column lines 442 and measuring the output voltage. FIG. 4 also illustrates adapter/controller 480 coupled to the accelerator A 410. Such an implementation allows for registers to measure power, performance, etc. at fine granularity. The implementation also allows for a pair of the accelerators with an active one in production mode, and an adaptable one in optimizing mode. Control of these accelerator modes can be effectuated via physical or logical implementations. The physical implementation may be employed via: a crossbar column (see Column, represented by dotted lines in FIG. 4); a crossbar (see XBar, represented by small dashed lines in FIG. 4); or an IMA unit, tile, chip, board (represented by large dashed lines in FIG. 4). The logical implementation is not presented in the figure, but could be derived from $g_{xy}$. As such, the logical implementation may be employed via a logical level layer or neural network.

FIG. 5 illustrates an example accelerator (i.e., memristive crossbar array) 510 in optimizing mode. As described above, FIG. 5 depicts operational parameters that can be altered to adjust the optimizing accelerator. Hence, accelerator 510 operates (at least temporarily) as an optimizing accelerator. Accelerator 510 includes components of the accelerator 410 shown in FIG. 4. FIG. 5 depicts a weight quantization 584 performed on multiple memristive elements 546. The weight quantization 584 effectuates a partial sum quantization 586 at the output of the ADC 530, which results in an activation quantization 588 being realized at the output of the shift-and-add unit 536.

FIG. 6 illustrates an example adaptive accelerator system 600 depicting ordering of data using data tagging 690. FIG. 6 depicts a process whereby data flows from both baseline and optimized accelerator into the adapter/controller which then makes a decision if and when to switch the roles. The adaptive accelerator system 600 includes baseline accelerator 610*a*, optimized accelerator 610*b*, adapter/controller 680, and the data tagging component 690. Data tagging enables inline tags into data streams to enable seamless switching. It is one example method of achieving proper ordering without glitches. By observing data tags on both accelerators and syncing them based on tags, glitches can be avoided. In addition, tags could be used for other purposes, such as classifying data so that the optimization process can be achieved much quicker, or identification of similar type of data which can be used for routing to the optimal accelerator path (for example, when multiple baseline accelerators are available).

The data pre-processing mentioned above with reference to FIG. 4 could be performed by at least one of the accelerators or depending on the type of pre-processing by other processing units in a pipeline prior to the accelerators. There are several design patterns to do feature transformation (data pre-processing). One option would be to embed the transform steps into the model graph (or deploy with model). In this case, the serving framework is responsible to place transform and ML model components onto appropriate components (e.g., accelerator-only or CPU for pre-processing and accelerator for ML model).

Another common design pattern is to use dedicated service to implement versioned data transformations for ML models (feature store). In the latter case, ML models accept input data as something they are given and cannot be changed. Theoretically, in the former case, it is indeed possible to also adapt data transformations (precision) to various environment conditions. Thus, pre-processing components could indeed be deployed on custom accelerators if inference framework provides this capability. In this case, data precision of these data transformation components can be adjusted.

At least one of the accelerators employed can measure QoS (power, latency, bandwidth) of the overall device (which is represented by the baseline accelerator at every point of time) as well as ML performance (e.g., accuracy, precision, recall etc.) at varying granularity levels (from crossbars, to layers, to chip, to end-to-end neural network). In terms of the type of granularity of precision information desired, this information is handled and used for algorithm execution in the adapter/controller. The implementation is agnostic to which type of precision is used, i.e., we could work with different precisions either at the physical (in one configuration, memristor and number of bits; or for Programmable Ultra-efficient Memristor-based Accelerator (PUMA) implementation, columns, crossbars, chip, board, etc.) or logical level (layer, neural network). Thus, the accelerators themselves can function at the chip level, but they could alternatively (or additionally) break down logical levels differently. For example, synchronized closed loops could be accomplished at the crossbar level. Other examples of implementation are possible. Furthermore, input/weights/activations could be handled collectively or separately.

The device (implemented in (and/or) software, hardware, firmware, etc.) can dynamically adapt a deployed ML model (e.g., a neural network) in an accelerator to achieve the desired QoS within allowed accuracy constraints.

The controller/adapter measures the delta in QoS to be able to make decision when to switch the accelerators from production mode to optimizing mode or from optimizing mode to production mode. Tagging of data can be used for ordering of data.

Some examples of effectuating switching include: when optimizing accelerator reaches better QoS than baseline with the parameters specified using input QoS; when optimizing is simply better than baseline independently of the QoS specified; default QoS policies of the device that may optimize reliability, power, and/or testing (these can be conducted periodically); and/or when baseline starts producing errors.

Figure 7:
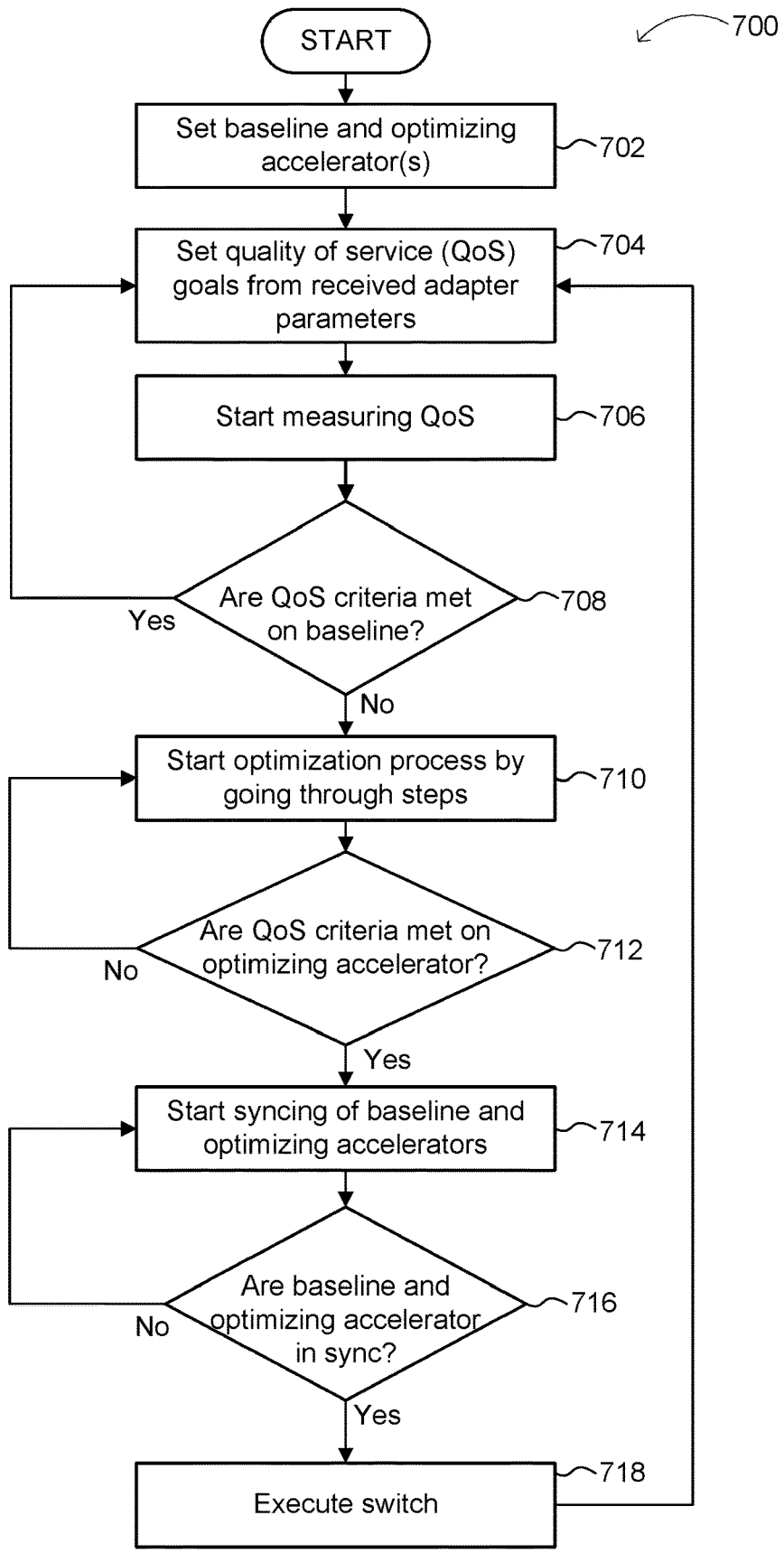
FIG. 7 is a flowchart illustrating a method of using an adaptive accelerator system, in accordance with one or more examples described herein.

FIG. 7 is a flowchart illustrating a method 700 of using an adaptive accelerator system. The method 700 includes setting baseline and optimizing accelerators (block 702). In accordance with some examples, setting the baseline and optimizing accelerators can refer to determining which accelerator is initially operating in a baseline mode, and which accelerator is initially operating in an optimizing mode.

The method 700 further includes setting QoS goals from received operation parameters (block 704). In some examples, setting QoS goals includes determining desired QoS goals (e.g., accuracy, latency, bandwidth, power, and/or responsiveness) within allowed accuracy constraints for the optimizing accelerator. The result of setting QoS goals from received operation parameters is the identification of a QoS threshold.

The method 700 further includes a start of measuring a QoS (block 706) from use of the baseline accelerator. In some examples, the start of the measuring of QoS includes measuring QoS parameters such as accuracy, latency, bandwidth, power, and/or responsiveness, stemming from the use of the baseline accelerator.

The method 700 further includes determining whether QoS criteria is met on the baseline accelerator (block 708). In accordance with some examples, determining whether QoS criteria is met on the baseline accelerator can refer to determining whether the measured QoS is better than the QoS threshold. If the QoS criteria is met on the baseline accelerator, then the method may proceed to block 704. In some examples, this cycle may repeat to keep the baseline accelerator in baseline mode (since QoS criteria continues to be met). Once the QoS criteria is not (or no longer) met on the baseline accelerator, then the method may proceed to block 710. In this example, when the QoS criteria is not (or no longer) met on the baseline accelerator, optimization of the baseline accelerator is desired to improve QoS from using the baseline accelerator. The improvement to the QoS from using the baseline accelerator would be effectuated by rendering a switch of the baseline accelerator to an optimizing accelerator.

The method 700 further includes a start of the optimization process by going through steps (block 710). In accordance with some examples, the steps to start the optimization process can refer to steps that are effectuated and controlled by the adapter/controller. The result of starting the optimization process is the eventual switching from the baseline accelerator to the optimizing accelerator.

The method 700 further includes determining whether QoS criteria is met on the optimizing accelerator (block 712). In accordance with some examples, determining whether QoS criteria is met on the optimizing accelerator can refer to determining whether the measured QoS is better than the QoS threshold. If the QoS criteria is not (or no longer) met on the optimizing accelerator, then the method may proceed to block 710. This means that optimization is still desired, and therefore the optimizing accelerator is maintained as the optimizing accelerator. Once the QoS criteria is met on the optimizing accelerator, then the method may proceed to block 714. This means that completion of optimization of the optimizing accelerator has occurred, resulting in an identification that a switch of the optimizing accelerator to a baseline accelerator should occur.

The method 700 further includes a start of syncing of the baseline and optimizing accelerators (block 714). In accordance with some examples, the syncing of the baseline and optimizing accelerators can ensure that both accelerators are properly identified by their respective baseline/optimizing modes to be used as such in the adaptable accelerator system. The syncing of the baseline and optimizing accelerators would avoid situations where both accelerators are identified as being of the same baseline or optimizing mode.

The method 700 further includes determining whether the baseline and optimizing accelerators are in sync (block 716). In some examples, if the baseline and optimizing accelerators are not in sync, then the process may proceed to block 714. This cycle repeats until both accelerators are in sync. In some examples, if the baseline and optimizing accelerators are in sync, then the process may proceed to block 718.

The method 700 further includes executing a switch of the accelerators (block 718). In some examples, this results in a switch from the accelerator initially operating in the baseline mode to an adapted optimizing accelerator, and from the accelerator initially operating in the optimizing mode to an adapted baseline accelerator.

Figure 8:
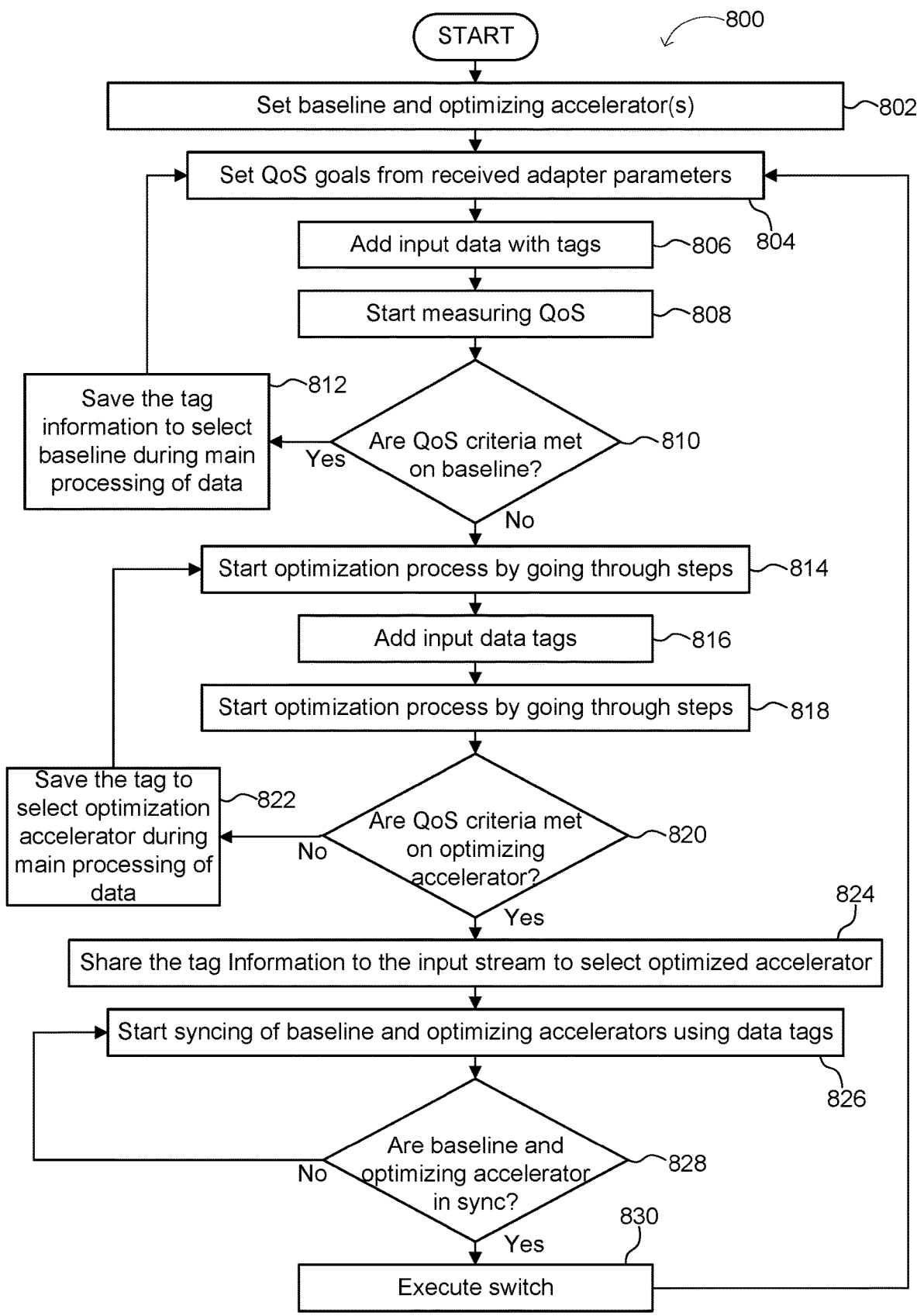
FIG. 8 is a flowchart illustrating a method of using an adaptive accelerator system including data tagging capabilities, in accordance with one or more examples described herein.

FIG. 8 is a flowchart illustrating a method 800 of using an adaptive accelerator system including data tagging capabilities. The method 800 includes setting baseline and optimizing accelerators (block 802). In accordance with some examples, setting the baseline can refer to determining which accelerator is initially operating in a baseline mode, and which accelerator is initially operating in an optimizing mode.

The method 800 further includes setting QoS goals from received operation parameters (block 804). In some examples, setting QoS goals includes determining desired QoS goals within allowed accuracy constraints for the optimizing accelerator. The result of setting QoS goals from received operation parameters is the identification of a QoS threshold.

The method 800 further includes adding input data with data tags (block 806). In accordance with some examples, the adding of the input data tags can refer to the adding of the input data tags to the input data stream for the measuring of the QoS on the baseline accelerator and the selecting of the baseline accelerator. In some examples, the use of data tags when measuring the QoS on the baseline accelerator and selecting the baseline accelerator can result in proper ordering of data without glitches, classifying data, etc.

The method 800 further includes a start of measuring QoS (block 808) from use of the baseline accelerator. In some examples, the start of the measuring QoS includes measuring QoS parameters such as accuracy, latency, bandwidth, power, and/or responsiveness, stemming from the use of the baseline accelerator.

The method 800 further includes determining whether QoS criteria is met on the baseline accelerator (block 810). In accordance with some examples, determining whether QoS criteria is met on the baseline accelerator can refer to determining whether the measured QoS is better than the QoS threshold. If the QoS criteria is met on the baseline accelerator, the tag information is saved to select the baseline accelerator during a main processing of data (block 812). The result of saving this tag information ensures the use of the baseline accelerator for the purpose of main processing of data (versus performing optimization which is reserved for the optimizing accelerator). In some examples, once the tag information is saved to select the baseline accelerator during main processing of data, then the method may proceed to block 804. In some examples, this cycle may repeat to keep the baseline accelerator in baseline mode (since QoS criteria continues to be met). Once the QoS criteria is not (or no longer) met on the baseline accelerator, then the method may proceed to block 814. In this example, when the QoS criteria is not (or no longer) met on the baseline accelerator, optimization of the baseline accelerator is desired to improve QoS from using the baseline accelerator. The improvement to the QoS from using the baseline accelerator would be effectuated by rendering a switch of the baseline accelerator to an optimizing accelerator.

The method 800 further includes a start of the optimization process by going through steps (block 814). In accordance with some examples, the steps to start the optimization process can refer to steps that are effectuated and controlled by the adapter/controller. The result of starting the optimization process is the eventual analyzing of the QoS criteria on the optimizing accelerator and selecting of the optimizing accelerator.

The method 800 further includes adding input data tags (block 816). In accordance with some examples, the adding of the input data tags can refer to the adding of the input data tags to the input data stream for the analyzing of the QoS criteria on the optimizing accelerator and the selecting of the optimizing accelerator. In some examples, the use of data tags when analyzing the QoS criteria on the optimizing accelerator and selecting the optimizing accelerator can result in proper ordering of data without glitches, classifying data, etc.

The method 800 further includes a start of the optimization process again by going through steps (block 818). In accordance with some examples, the steps to start the optimization process again can refer to steps that are effectuated and controlled by the adapter/controller. The result of starting the optimization process again (this time with data tags) is the eventual analyzing of the QoS criteria on the optimizing accelerator and selecting of the optimizing accelerator, while using data tags to benefit from proper ordering of data without glitches, classifying data, etc.

The method 800 further includes determining whether QoS criteria is met on the optimizing accelerator (block 820). In accordance with some examples, determining whether QoS criteria is met on the optimizing accelerator can refer to determining whether the measured QoS is better than the QoS threshold. If the QoS criteria is not (or no longer) met on the optimizing accelerator, the data tag information is saved to select the optimizing accelerator during a main processing of data (block 812). The result of saving this data tag information ensures the use of the optimizing accelerator for the purpose of performing optimization (versus a main processing of data which is reserved for the baseline accelerator). In some examples, once the tag information is saved to select the optimizing accelerator, then the method may proceed to block 814. This means that optimization is still desired, and therefore the optimizing accelerator is maintained as the optimizing accelerator along with the saved data tag. Once the QoS criteria is met on the optimizing accelerator, then the method may proceed to block 824. This means that completion of optimization of the optimizing accelerator has occurred, resulting in an identification that a switch of the optimizing accelerator to a baseline accelerator should occur.

The method 800 further includes sharing the data tag Information to the input stream to select the optimized accelerator (block 824). This means that completion of optimization of the optimizing accelerator has occurred using data tag information shared via the data input stream, resulting in an identification that a switch from the optimizing accelerator to a baseline accelerator should occur.

The method 800 further includes a start of syncing of the baseline and optimizing accelerators using data tags (block 826). In accordance with some examples, the syncing of the baseline and optimizing accelerators can ensure that both accelerators are properly identified by their respective baseline/optimizing modes to be used as such in the adaptable accelerator system. The syncing of the baseline and optimizing accelerators would avoid situations where both accelerators are identified as being of the same baseline or optimizing mode. Moreover, since data tags are observed on both accelerators, the syncing of the accelerators using the data tags can result in proper ordering of data without glitches, classifying data, etc.

The method 800 further includes determining whether the baseline and optimizing accelerators are in sync (block 828). In some examples, if the baseline and optimizing accelerators are not in sync, then the process may proceed to block 826. This cycle repeats until both accelerators are in sync (while using data tags). In some examples, if the baseline and optimizing accelerators are in sync, then the process may proceed to block 830.

The method 800 further includes executing a switch of the accelerators (block 830). In some examples, this results in a switch from the accelerator initially operating in the baseline mode to an adapted optimizing accelerator, and from the accelerator initially operating in the optimizing mode to an adapted baseline accelerator.

Self-Adaptable Accelerators

The example implementation of self-adaptable accelerators uses a baseline (production) accelerator (e.g., accelerator 610a in FIG. 6), optimizing accelerator (e.g., accelerator 610b), and control (hardware) accelerator (e.g., adapter/controller 680) and an operation of switching between production and optimizing. The two primary accelerators (i.e., the production accelerator 610a and optimizing accelerator 610b) are of the same capability. One of the primary accelerators 610a will be in production mode, while the other primary accelerator 610b will be in optimizing mode. On the optimizing accelerator 610b, optimizations are conducted, such as tweaking weights, partial sum quantization, and bypassing tiles and layers, to achieve better QoS by targeting QoS goals such as accuracy performance (e.g., latency, bandwidth), power, and/or responsiveness. The control accelerator (or adapter/controller 680) observes execution of the optimizing accelerator 610b and attempts to learn behavior of the two primary accelerators 610a, 610b in order to achieve QoS goals which are requested/identified (see "Switching of Accelerators" section below). The control accelerator 680 also instructs (controls) the optimizing accelerator 610b as to how to adapt to achieve the QoS goals. Once a QoS goal is achieved, the control accelerator 680 triggers a switch of the modes of the primary accelerators 610a, 610b, whereby the earlier production accelerator 610a now becomes the optimizing accelerator 610b, and the earlier optimizing accelerator 610b now becomes the production accelerator 610a. The switch could be accomplished by gating out the output of one or the other of the primary accelerators 610a, 610b. However, the switch would ideally be performed at the appropriate moments to avoid glitches in the streamed data.

The QoS from the primary accelerators 610a, 610b can be expressed in terms (which can be autonomously adjusted) to enable the controller/adapter 680 to make decisions in terms of accuracy, power, bandwidth, latency, responsiveness, speed of accuracy, etc., while adopting training techniques using feedback via employing memory on how previous optimizations worked, to effectuate tweaking of the optimizations as instructed by the adapter/controller 680. An example goal specification would be: accuracy>80%, power<20 mW, bandwidth>10 MB/s, latency<10 ms, etc.; speed of achieving the goals (such as accuracy, power, bandwidth, latency, and/or responsiveness). The speed of achieving the goals can be expressed as time-to-goal for each of the goals listed. The measurements of the QoS may be accomplished in different ways. Accuracy can be measured compared to its own accuracy or compared to a baseline threshold with different ways of measuring its trend and absolute values. Power can be measured or calculated off of the devices that are employed with the primary accelerators 610a, 610b; latency and bandwidth can be measured by the respective differences between input and output. Feedback on the trend of optimization (i.e., the optimization progress) is used to compare trending of QoS goals over different time intervals (immediate, medium, and long-term), to enable proper reaction to optimizations. Algorithms can be expressed as to how to reach these policies (see "Switching Algorithms" section below).

Autonomous adjustment of QoS can utilize dynamic policies. In other words, a QoS that defines a performance metric does not need to be constant. It can be changed by a human operator or can dynamically evolve/adapt as internal or external conditions change. The QoS can be defined or represented in two ways: the QoS can be represented in the form of an aggregated criteria that combines individual performance metrics using the individual performance metrics' linear combination; or the QoS can use one optimizing metric while relying on other optimizing metrics as satisficing metrics. A model should meet satisficing metrics, and then the optimizing accelerator 610b can be further optimized according to an optimizing metric.

Whether option one or two is used, an individual QoS performance metric can dynamically evolve. The following example factors can impact the change in QoS: available power (for edge devices with limited battery power, the tradeoff between model accuracy and power consumption can change depending on battery status); degradation of external sensors or actuators (for models that are expensive to replace, when external sensors or actuators degrade, model accuracy constraints can be relaxed); and/or special geographical areas/locations of interest (when a model finds itself in a high-interest location, it can increase its performance constraints while relaxing its power constraints).

Switching of Accelerators

The adapter/controller 680 measures the delta in QoS to be able to make a decision when to switch. Once the QoS goal is achieved a first time, the modes of the primary accelerators 610a, 610b could be switched, but it does not mean that they will switch instantly, i.e., to initiate the switching process, the optimizing accelerator 610b may be marked switchable$_{candidate}$. In this instance, sufficient time may be desired to assure stable QoS goals are achieved, so that switching will not result in a reverse switch back. Once stability is guaranteed, the optimizing accelerator 610b may be marked switchable$_{stable}$. This scheme could be generalized to multiple optimizing accelerators (one of which being, for example, optimizing accelerator 610*b*), each of which could be in any of the states of optimizing, switchable$_{candidate}$, and switchable$_{stable}$.

In order to effectuate seamless switching without any glitches in output, data from the baseline accelerator 610*a* needs to be flushed out, while effectively activating the optimizing accelerator 610*b*. From an observer outside of the box, there should not be any noticeable difference during the switching process, i.e., the switching process should be seamless. One way to achieve the seamless switching is to redirect the data from one primary accelerator to the output of the other primary accelerator. Because the two primary accelerators 610*a*, 610*b* could be out of sync, the faster primary accelerator may have to wait for the slower primary accelerator to catch up, resulting in the adapter/controller 680 effectuating flow control and/or buffering for the slower primary accelerator in order to increase its speed to at least that of the faster primary accelerator.

One way of achieving proper ordering of data without glitches is through the use of tagging of data (see FIGS. 6 and 8). By observing data tags on both primary accelerators 610*a*, 610*b* during the baseline/optimizing accelerator selection process and by syncing the primary accelerators 610*a*, 610*b* using the data tags, glitches in output can be avoided. In addition, tags could be used for other purposes, such as: classifying data so that the optimization process can be achieved much quicker; and identification of a similar type of data and routing that similar type of data to the optimal baseline accelerator path (if multiple baseline accelerators (one of which being, for example, baseline accelerator 610*a*) are available). In this way, the baseline accelerator which is determined as being best equipped to handle a particular type of data is chosen as the destination baseline accelerator, therefore resulting in a more efficient data throughput via use of the optimal baseline accelerator.

Switching Algorithms

When the optimizing accelerator 610*b* results in a better QoS compared to an input QoS from using the baseline accelerator 610*a*, an accelerator switch effectuated by an algorithm may be warranted. In this scenario, a switch from the optimizing accelerator 610*b* to the production accelerator 610*a* would be desired. The QoS goals are specified as parameters that are sent to the adapter/controller 680. These parameters could be sent during runtime (in-band) or during management time (out-of-band). The adapter/controller 680 measures the QoS from using the optimizing accelerator 610*b* and makes a decision when to switch optimizing/production modes of the primary accelerators 610*a*, 610*b*. The policies used in making the decision could be complex with specific criteria including timing. For example, the criteria could be dependent on whether power is within an envelope, whether bandwidth/latency criteria is met, etc. The QoS from using the baseline accelerator 610*a* can also drift away, causing the optimizing to perform better over time, resulting in a switch of the optimizing/production modes.

When an optimizing accelerator 610*b* is simply better than a baseline accelerator 610*a*, independently of the QoS goal/threshold specified. The primary accelerators 610*a*, 610*b* switch their modes when an optimizable accelerator 610*b* achieves its QoS and is better than the QoS of the baseline accelerator 610*a*. In certain cases, it makes sense to switch the modes of the primary accelerators 610*a*, 610*b* immediately when one primary accelerator is simply better than the other. One use case that fits this scenario is when a primary accelerator is recovering from a previous low battery status, then a relaxed QoS of the currently active primary accelerator could be used. Instead of waiting for the optimizing accelerator 610*b* to achieve a new target QoS, a temporary QoS could be set to be "slightly better than the active primary accelerator". The primary accelerators 610*a*, 610*b* can therefore quickly change their modes, maintaining a better level of QoS.

Default QoS policies of the adapter/controller 680 may be conducted periodically to optimize reliability, power, testing, etc. In addition to optimizing policies, the primary accelerators 610*a*, 610*b* can also (or alternatively) execute some of the testing policies, e.g. by comparing an output of both primary accelerators 610*a*, 610*b* for a predefined data set or a spectrum of data. Power consumption can be calibrated against predefined limits, and reliability can be assessed for each of the primary accelerators 610*a*, 610*b*.

The baseline accelerator 610*a* can start producing errors, or may dramatically decrease its performance within a short period of time. This can happen due to failures in hardware or system software or firmware. When this happens, the primary accelerators 610*a*, 610*b* can switch their modes even though the optimizing accelerator 610*b* has not achieved its QoS constraints yet.

Some examples of possible hardware specific changes (beyond-software) that may be used for performing optimization include: coarse (core-level) quantization vs array-level quantization; re-routing (short-circuiting) certain layers of the neural network; offline (during non-operation of the accelerator system) vs real-time optimizations (during operation of the accelerator system); and training primary accelerators (e.g., primary accelerators 610*a*, 610*b*) that are quantization friendly, and expanding the training to combat other accelerator (hardware)-specific losses such as: loss function plus model (half or single precision) and emulating inference on hardware; and computing loss in real-time so that training is hardware friendly from the beginning.

Some example degrees of self-adaptation include: static (non-mode adapting) primary accelerators, where tagged data would then be re-routed to an appropriate dynamic (mode adapting) primary accelerator (e.g., where multiple primary accelerators (one of which being, for example, one of the primary accelerators 610*a*, 610*b*) having the same mode are used); dynamically adapting (reconfiguring) a primary accelerator (one of which being, for example, one of the primary accelerators 610*a*, 610*b*) for inference purposes (e.g., for executing inference on hardware); dynamically adapting (reconfiguring) a primary accelerator (one of which being, for example, one of the primary accelerators 610*a*, 610*b*) for training purposes; and analyzing/learning about data streams to reconfigure a primary accelerator (one of which being, for example, one of the primary accelerators 610*a*, 610*b*).

Figure 9:
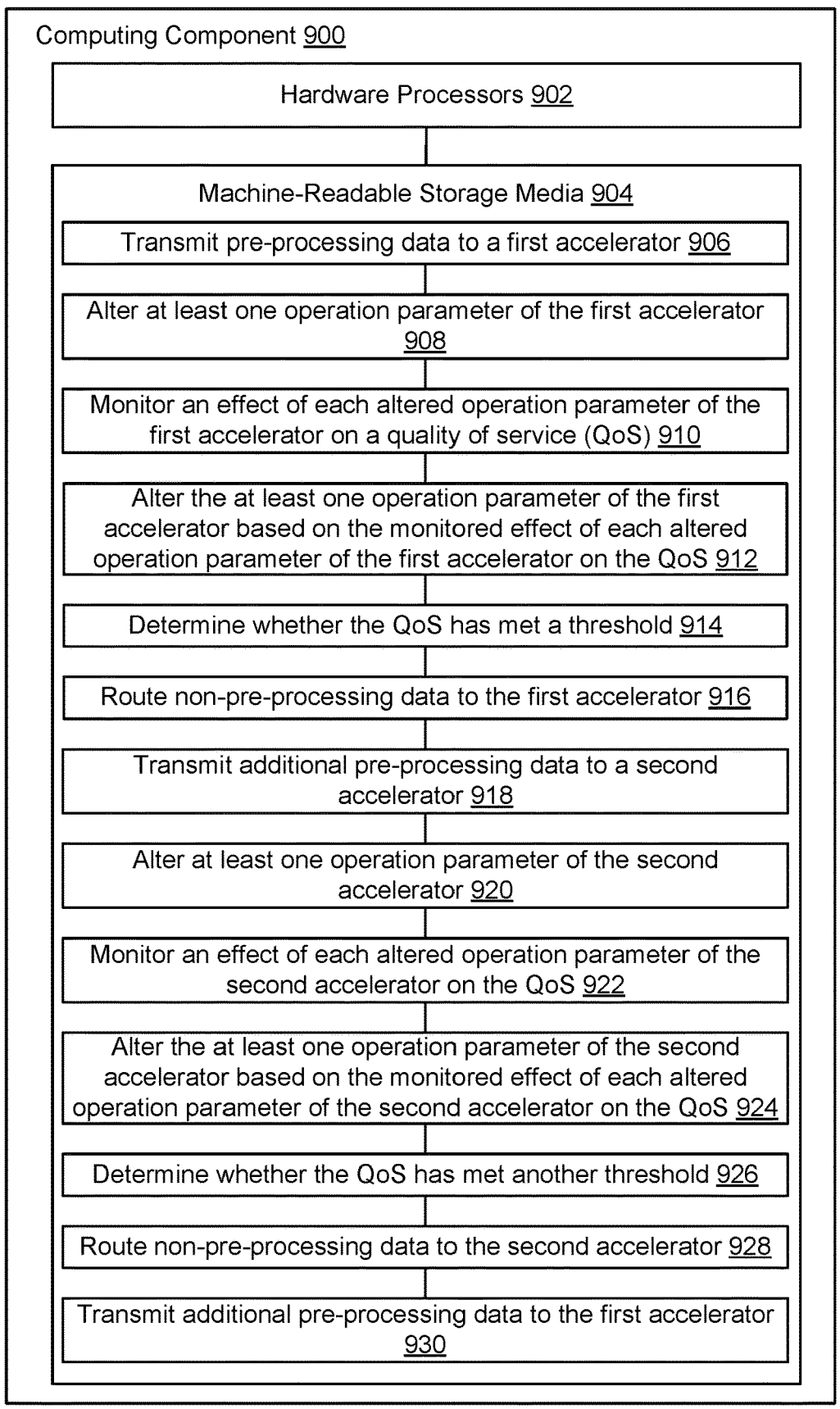
FIG. 9 is a computing component that may be used to implement various features of examples described in the present disclosure.

FIG. 9 illustrates an example computing component that may be used to implement the dynamically modular and customizable computing systems in accordance with various aspects of the disclosure. Referring now to FIG. 9, computing component 900 may be, for example, a server computer, a controller, or any other similar computing component capable of processing data. In the example implementation of FIG. 9, the computing component 900 includes a hardware processor 902, and machine-readable storage medium for 904. In some examples, computing component 900 may be an aspect of a system corresponding with memristor crossbar array 100 of FIG. 1.

Hardware processor 902 may be one or more central processing units (CPUs), semiconductor-based microprocessors, and/or other hardware devices suitable for retrieval and execution of instructions stored in machine-readable storage medium 904. Hardware processor 902 may fetch, decode, and execute instructions, such as instructions 906-930, to control processes or operations for implementing the dynamically modular and customizable computing systems. As an alternative or in addition to retrieving and executing instructions, hardware processor 902 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EE-PROM), a storage device, an optical disc, and the like. In some examples, machine-readable storage medium 904 may be a non-transitory storage medium, where the term "non-transitory" does not encompass transitory propagating signals. As described in detail below, machine-readable storage medium 904 may be encoded with executable instructions, for example, instructions 906-930.

Hardware processor 902 may execute instruction 906 to transmit pre-processing data to a first accelerator. This means that the first accelerator is initially and continually functioning to process data, while in optimizing mode (i.e., as an optimizing accelerator (e.g., accelerator 610b in FIG. 6)).

Hardware processor 902 may execute instruction 908 to alter at least one operation parameter of the first accelerator. This occurs during operation of the first accelerator.

Hardware processor 902 may execute instruction 910 to monitor an effect of each altered operation parameter of the first accelerator on a quality of service (QoS). This means that the QoS is monitored from use of the first accelerator having altered operation parameters.

Hardware processor 902 may execute instruction 912 to alter the at least one operation parameter of the first accelerator based on the monitored effect of each altered operation parameter of the first accelerator on the QoS. This means that an attempt to improve the QoS is made by further altering the operation parameters of the first accelerator.

Hardware processor 902 may execute instruction 914 to determine whether the QoS has met a threshold. An example of a threshold could be a percentage (e.g., 95%) of QoS (e.g., latency, bandwidth, or an application specific metric such as precision). Alternatively, the threshold can be understood as to what extent imperfection can be tolerated of the accelerator. For instance, a machine learning expert might specify the desired level of model accuracy to be, for example, 91%. It is noted that a hardware expert might expect a certain level of uncertainty associated with programming conductance of memristor cells. For example, a 91% accuracy might translate to, for example, a 89%-93% range. This means that with a QoS target at 91%, an actual accuracy above 89% is acceptable. In another possible scenario, degradation might be observed at a hardware level that can determine how accurate the crossbar cells can actually be programmed. In this case, given that the degradation and its impact on a QoS metric can be measured or estimated, the threshold may be increased when, for example, a bigger difference between desired and actual performance can be tolerated. For instance, in the example above, a desired threshold range difference from the target may be equal to 2 percent points (with 91% being the target, while an actual accuracy above 89% is acceptable). Then, as the ability to precisely re-program crossbar arrays degrades, a move to a 91% target with a wider threshold range difference equal to, for example, 5 percentage points may be acceptable. Generally, accuracy of the hardware of above 86% would be acceptable.

Once a determination is made that the QoS has met the threshold (meaning the first accelerator has been fully optimized, and no further optimizing of the first accelerator is called for, hardware processor 902 may execute instruction 916 to route non-pre-processing data to the first accelerator (which will now function as a baseline accelerator (e.g., accelerator 610a in FIG. 6)), and instruction 918 to transmit additional pre-processing data to a second accelerator (which is set as an optimizing accelerator (e.g., accelerator 610b)). This sets up the second accelerator for analysis of the resultant effect on QoS from an eventual altering of parameters of the second accelerator.

Hardware processor 902 may execute instruction 920 to alter at least one operation parameter of the second accelerator. This occurs during operation of the second accelerator.

Hardware processor 902 may execute instruction 922 to monitor an effect of each altered operation parameter of the second accelerator on the QoS. This means that the QoS is monitored from use of the second accelerator having altered operation parameters.

Hardware processor 902 may execute instruction 924 to alter the at least one operation parameter of the second accelerator based on the monitored effect of each altered operation parameter of the second accelerator on the QoS. This means that an attempt to improve the QoS is made by further altering the operation parameters of the second accelerator.

Hardware processor 902 may execute instruction 926 to determine whether the QoS has met another threshold. Once a determination is made that the QoS has met the another threshold (meaning the second accelerator has been fully optimized, and no further optimizing of the second accelerator is called for), hardware processor 902 may execute instruction 928 to route non-pre-processing data to the second accelerator (which will now function as a baseline accelerator (e.g., accelerator 610a)), and instruction 930 to transmit additional pre-processing data to the first accelerator (which is now set as an optimizing accelerator (e.g., accelerator 610b)).

In some examples, the QoS comprises at least one of: (i) accuracy; (ii) latency; (iii) bandwidth; (iv) power; and (v) responsiveness.

In some examples, both altering steps comprise at least one of: (i) tweaking weights; (ii) partial sum quantization; (iii) bypassing tiles; and (iv) bypassing layers.

In some examples, the first accelerator is in an optimizing mode and the second accelerator is in a production mode, during the transmitting pre-processing data step, both altering steps, and monitoring step; and the first accelerator is in a production mode and the second accelerator is in an optimizing mode, during the routing step and the transmitting additional pre-processing data step.

In some examples, when the determination is made that the QoS has met the threshold, the first accelerator switches from an optimizing mode to a production mode, and the second accelerator switches from a production mode to an optimizing mode.

In some examples, when the determination is made that the QoS has met the another threshold, the second accelerator switches from an optimizing mode to a production mode, and the first accelerator switches from a production mode to an optimizing mode.

In some examples, the first accelerator and second accelerator have different arithmetic precision.

Figure 10:
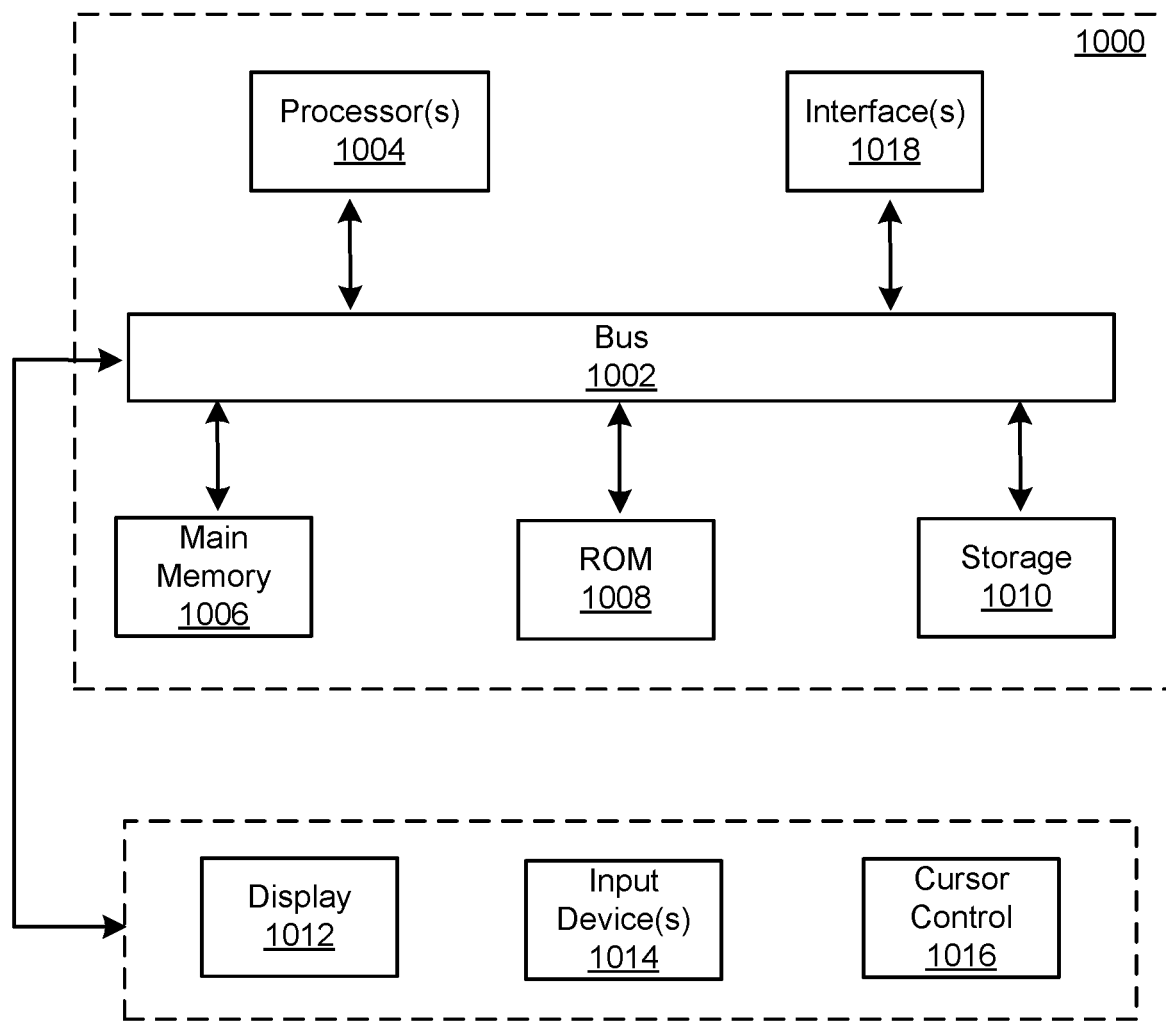
FIG. 10 depicts a block diagram of a computer system in which various features of examples described herein may be implemented.

FIG. 10 depicts a block diagram of an example computer system 1000 in which various of the aspects described herein may be implemented. The computer system 1000 may be used to execute machine readable instructions to perform the processes described herein. In some examples, computer system 1000 may correspond with modular switch system 100 or currently configured switch system 140 of FIG. 1, although should not be limiting to the disclosure of components provided herein.

The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read-only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some examples, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAS, firmware and/or program logic which in combination with the computer system causes or programs computer system 1000 to be a special-purpose machine. According to one example, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples of the disclosure include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable medium storing instructions that cause one or more processors of an electronic device to perform operations comprising:
   transmitting pre-processing data to a first accelerator;
   altering at least one operation parameter of the first accelerator;
   monitoring an effect of each altered operation parameter of the first accelerator on a quality of service (QoS);
   altering the at least one operation parameter of the first accelerator based on the monitored effect of each altered operation parameter of the first accelerator on the QoS; and
   determining whether the QoS has met a threshold, wherein the following additional operations are performed once a determination is made that the QoS has met the threshold:
   routing non-pre-processing data to the first accelerator; and
   transmitting additional pre-processing data to a second accelerator;
   whereby the first accelerator is adaptable by switching from an optimizing mode to a production mode.

2. The non-transitory machine-readable medium of claim 1, wherein the operations further comprise:
   altering at least one operation parameter of the second accelerator;
   monitoring an effect of each altered operation parameter of the second accelerator on the QoS;

altering the at least one operation parameter of the second accelerator based on the monitored effect of each altered operation parameter of the second accelerator on the QoS; and
determining whether the QoS has met another threshold, wherein the following additional operations are performed once a determination is made that the QoS has met the another threshold:
routing non-pre-processing data to the second accelerator; and
transmitting additional pre-processing data to the first accelerator.

3. The non-transitory machine-readable medium of claim 1, wherein the QoS comprises at least one of: (i) accuracy; (ii) latency; (iii) bandwidth; (iv) power; and (v) responsiveness.

4. The non-transitory machine-readable medium of claim 1, wherein both altering steps comprise at least one of: (i) tweaking weights; (ii) partial sum quantization; (iii) bypassing tiles; and (iv) bypassing layers.

5. The non-transitory machine-readable medium of claim 1, wherein:
the first accelerator is in an optimizing mode and the second accelerator is in a production mode, during the transmitting pre-processing data step, both altering steps, and monitoring step; and
the first accelerator is in a production mode and the second accelerator is in an optimizing mode, during the routing step and the transmitting additional pre-processing data step.

6. The non-transitory machine-readable medium of claim 1, wherein once the determination is made that the QoS has met the threshold, the first accelerator switches from an optimizing mode to a production mode, and the second accelerator switches from a production mode to an optimizing mode.

7. The non-transitory machine-readable medium of claim 2, wherein once the determination is made that the QoS has met the another threshold, the second accelerator switches from an optimizing mode to a production mode, and the first accelerator switches from a production mode to an optimizing mode.

8. The non-transitory machine-readable medium of claim 1, wherein the first accelerator and second accelerator have different arithmetic precision.

9. A method comprising:
setting a first accelerator initially operating in a baseline mode and a second accelerator initially operating in an optimizing mode;
setting quality of service (QoS) goals from parameters received from an adapter that is communicatively connected to the first accelerator and second accelerator;
measuring a QoS from operating the first accelerator; and
determining whether the measured QoS from operating the first accelerator has met the QoS goal associated with the first accelerator, wherein if the QoS goal associated with the first accelerator is met, the first accelerator is maintained as a baseline accelerator, and wherein if the QoS goal associated with the first accelerator is not met, the first accelerator is optimized, by rendering a switch of the first accelerator to an adapted optimizing accelerator.

10. The method of claim 9, wherein the method further comprises:
measuring a QoS from operating the second accelerator; and
determining whether the measured QoS from operating the second accelerator has met the QoS goal associated with the second accelerator, wherein if the QoS goal associated with the second accelerator is not met, the second accelerator is maintained as an optimizing accelerator, and wherein if the QoS goal associated with the second accelerator is met, the second accelerator is no longer optimized, by rendering a switch of the second accelerator to an adapted baseline accelerator.

11. The method of claim 9, wherein the method further comprises:
syncing the first accelerator and second accelerator prior to the rendering of the switch of the first accelerator to the adapted optimizing accelerator, and prior to the rendering of the switch of the second accelerator to the adapted baseline accelerator.

12. The method of claim 9, wherein the first accelerator and second accelerator have different arithmetic precision.

13. An accelerator system comprising:
a first accelerator;
a second accelerator;
a processor; and
a memory configured to store instructions that, in response to being executed by the processor, cause the processor to:
alter at least one operation parameter of the first accelerator;
monitor an effect of each altered operation parameter of the first accelerator on a quality of service (QoS);
alter the at least one operation parameter of the first accelerator based on the monitored effect of each altered operation parameter of the first accelerator on the QoS; and
determine whether the QoS has met a threshold, wherein once a determination is made that the QoS has met the threshold, the first accelerator is configured to switch from an optimizing mode to a production mode, and the second accelerator is configured to switch from a production mode to an optimizing mode.

14. The accelerator system of claim 13, wherein the instructions further cause the processor to:
alter at least one operation parameter of the second accelerator;
monitor an effect of each altered operation parameter of the second accelerator on the QoS;
alter the at least one operation parameter of the second accelerator based on the monitored effect of each altered operation parameter of the second accelerator on the QoS; and
determine whether the QoS has met another threshold, wherein once a determination is made that the QoS has met the another threshold, the second accelerator is configured to switch from an optimizing mode to a production mode, and the first accelerator is configured to switch from a production mode to an optimizing mode.

15. The accelerator system of claim 13, wherein the QoS comprises at least one of: (i) accuracy; (ii) latency; (iii) bandwidth; (iv) power; and (v) responsiveness.

16. The accelerator system of claim 13, wherein both alter steps comprise at least one of: (i) tweaking weights; (ii) partial sum quantization; (iii) bypassing tiles; and (iv) bypassing layers.

17. The accelerator system of claim 13, wherein:
the first accelerator is initially configured to receive pre-processing data; and
once the determination is made that the QoS has met the threshold, the instructions further cause the processor to:
  route non-pre-processing data to the first accelerator; and
  transmit additional pre-processing data to the second accelerator.

18. The accelerator system of claim 17, wherein:
the first accelerator is configured to be in an optimizing mode and the second accelerator is configured to be in a production mode, during receipt of the pre-processing data by the first accelerator, during both alter steps, and during the monitor step; and
the first accelerator is in a production mode and the second accelerator is in an optimizing mode, during the route step and the transmit additional pre-processing data step.

19. The accelerator system of claim 14, wherein once the determination is made that the QoS has met the another threshold, the instructions further cause the processor to:
  route non-pre-processing data to the second accelerator; and
  transmit additional pre-processing data to the first accelerator.

20. The accelerator system of claim 13, wherein the first accelerator and second accelerator have different arithmetic precision.

* * * * *